US008134680B2

(12) United States Patent
Hirato

(10) Patent No.: US 8,134,680 B2
(45) Date of Patent: Mar. 13, 2012

(54) MANUFACTURING METHOD OF LIQUID CRYSTAL PANEL

(75) Inventor: Shinichi Hirato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 200 days.

(21) Appl. No.: 12/679,564

(22) PCT Filed: Jun. 9, 2008

(86) PCT No.: PCT/JP2008/060520
§ 371 (c)(1),
(2), (4) Date: Mar. 23, 2010

(87) PCT Pub. No.: WO2009/041126
PCT Pub. Date: Apr. 2, 2009

(65) Prior Publication Data
US 2010/0210167 A1    Aug. 19, 2010

(30) Foreign Application Priority Data

Sep. 26, 2007   (JP) ................................ 2007-249547

(51) Int. Cl.
G02F 1/1339    (2006.01)
G02F 1/13      (2006.01)
(52) U.S. Cl. ......... 349/187; 349/153; 349/190; 349/192
(58) Field of Classification Search .................. 349/153, 349/190, 192
See application file for complete search history.

(56) References Cited

U.S. PATENT DOCUMENTS 6,501,527 B1    12/2002   Hirose et al.

FOREIGN PATENT DOCUMENTS

| JP | 2-120719 | 5/1990 |
|---|---|---|
| JP | 2-234121 | 9/1990 |
| JP | 2-310525 | 12/1990 |

(Continued)

OTHER PUBLICATIONS

U.S. Appl. No. 12/679,569, filed Mar. 23, 2010, entitled "Liquid Crystal Panel, Liquid Crystal Display Device, Television Receiver and Manufacturing Method of Liquid Crystal Panel".

(Continued)

*Primary Examiner* — Uyen Chau N Le
*Assistant Examiner* — Chris Chu
(74) *Attorney, Agent, or Firm* — Nixon & Vanderhye, P.C.

(57) ABSTRACT

A manufacturing method of a liquid crystal panel 10 includes a panel manufacturing process, a substrate detachment process and a reuse-panel manufacturing process. A first liquid crystal panel 10A and a second liquid crystal panel 10B, which differ from each other in position of a sealant portion 20A, 20B to be formed thereon, are manufactured by the panel manufacturing process. Substrates 17, 18 are detached from a defective liquid crystal panel, i.e., from any one of the first liquid crystal panel 10A and the second liquid crystal panel 10B having a defect, by the substrate detachment process. The reuse-panel manufacturing process manufactures a third liquid crystal panel 10C by attaching the substrate 18A detached from the first liquid crystal panel 10A and the substrate 17B detached from the second liquid crystal panel 10B to each other. The reuse-panel manufacturing process includes a sealant-portion forming process that forms a third sealant portion 20C on the substrate 18A detached from the first liquid crystal panel 10A. The third sealant portion 20C is located to differ in position from both of a first sealant portion 20A on the first liquid crystal panel 10A and a second sealant portion 20B on the second liquid crystal panel 10B.

7 Claims, 29 Drawing Sheets

FOREIGN PATENT DOCUMENTS

| | | |
|---|---|---|
| JP | 4-060612 | 2/1992 |
| JP | 6-18902 | 1/1994 |
| JP | 7-175072 | 7/1995 |
| JP | 7-230081 | 8/1995 |
| JP | 7-270808 | 10/1995 |
| JP | 8-76130 | 3/1996 |
| JP | 2000-137229 | 5/2000 |
| JP | 2001-166318 | 6/2001 |
| JP | 2002-327030 | 11/2002 |
| JP | 2004-037855 | 2/2004 |
| JP | 2006-99018 | 4/2006 |

OTHER PUBLICATIONS

International Search Report for PCT/JP2008/060519, mailed Aug. 19, 2008.

International Search Report for PCT/JP2008/060520, mailed Jul. 8, 2008.

FIG.1
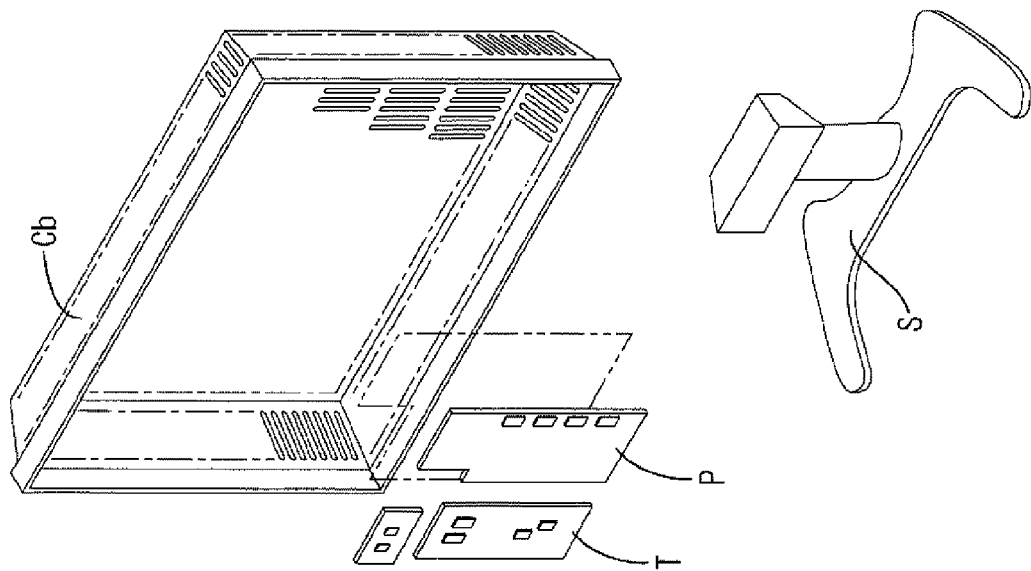
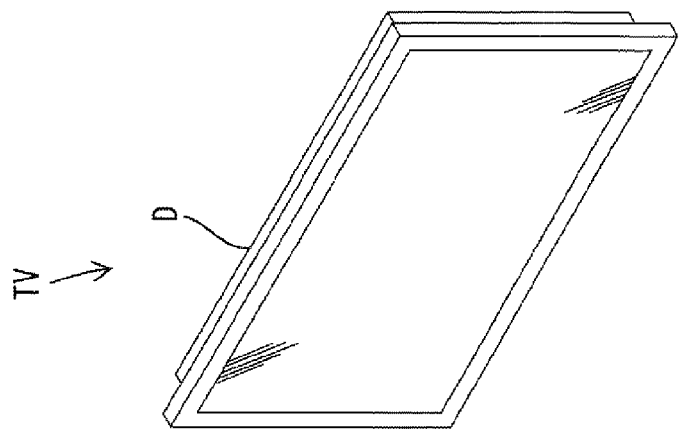
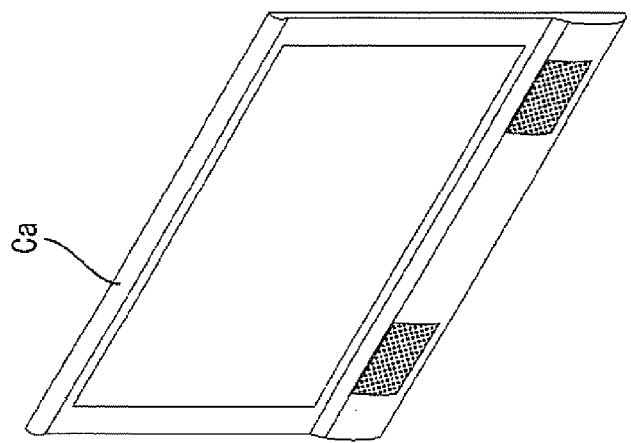

FIG.9
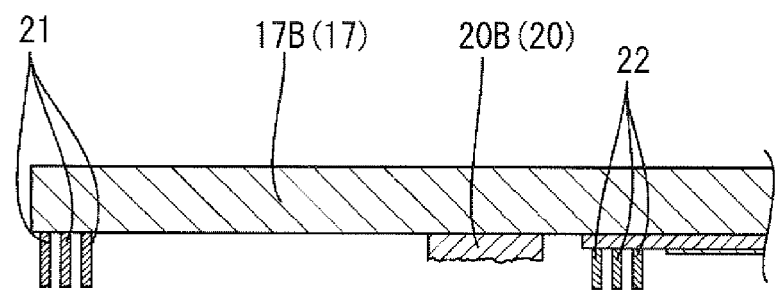
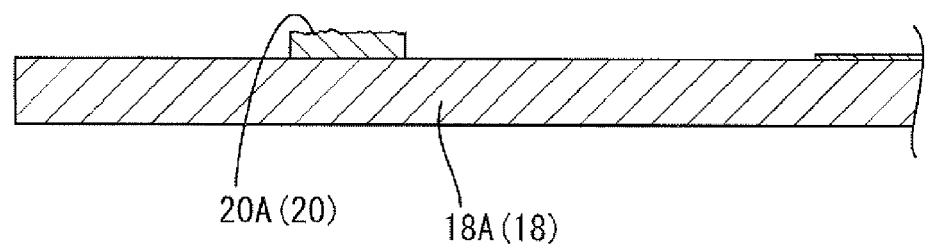

MANUFACTURING METHOD OF LIQUID CRYSTAL PANEL

This application is the U.S. national phase of International Application No. PCT/JP2008/060520 filed 9 Jun. 2008, which designated the U.S. and claims priority to Japan Application No. 2007-249547 filed 26 Sep. 2007, the entire contents of each of which are hereby incorporated by reference.

TECHNICAL FIELD

The present invention relates to a manufacturing method of a liquid crystal panel.

BACKGROUND ART

A liquid crystal panel as a major component of a liquid crystal display device is conventionally constructed as follows: A liquid crystal layer of the liquid crystal panel is provided between a pair of glass substrates, and a sealant portion for sealing the liquid crystal layer is formed to surround the liquid crystal layer. One of the substrates is provided as an array substrate having TFTs and various wiring lines, while the other substrate is provided as a CF substrate having a color filter and the like.

In a manufacturing process of the liquid crystal panel, an inspection is performed in the final step. Even when a defect has been detected solely on one of the array substrate and the CF substrate by the inspection, the whole liquid crystal panel is identified as a defective product, resulting in rejection.

In this connection, Patent Document 1 below describes a technique for achieving reuse of a non-defective substrate or a substrate repairable to a non-defective state. According to the technique, two substrates are first attached to each other via a thermoplastic sealant portion, and the resultant structure is subjected to inspection. If it is identified as a non-defective product, a non-thermoplastic sealant portion is formed on the outer side of the thermoplastic sealant portion in order to improve adhesion. In contrast, if the structure is identified as a defective product, the thermoplastic sealant portion is softened by heat, and thereby the substrates are detached for reuse.

Patent Document 1: JP-A-H7-175072

PROBLEM TO BE SOLVED BY THE INVENTION

However, the technique described in the above Patent Document 1 may be associated with increase in the number of processes and therefore in cost, because double sealing is required for all the liquid crystal panels to be manufactured.

Further, in a process of reusing the substrates, the thermoplastic sealant portion should be completely removed from the detached substrates. Although it is easier to remove than an ordinary or thermoset sealant, the complete removal may require time and cost.

That is, the technique described in the above Patent Document 1 is far from practical in view of the current growing desire for low-cost fabrication.

DISCLOSURE OF THE INVENTION

The present invention was made in view of the foregoing circumstances, and an object thereof is to reduce the manufacturing cost.

MEANS FOR SOLVING THE PROBLEM

The present invention provides a manufacturing method of a liquid crystal panel having a construction in which a liquid crystal layer and a sealant portion surrounding and sealing the liquid crystal layer are provided between a pair of substrates attached to each other. The manufacturing method includes manufacturing a first liquid crystal panel and a second liquid crystal panel by a panel manufacturing process. The first liquid crystal panel and the second liquid crystal panel differ from each other in position of the sealant portion to be formed thereon. The manufacturing method further includes detaching the substrates from a defective liquid crystal panel by a substrate detachment process. The defective liquid crystal panel is any one of the first liquid crystal panel and the second liquid crystal panel that includes a defect. The manufacturing method further includes manufacturing a third liquid crystal panel by a reuse-panel manufacturing process. The third liquid crystal panel is formed by attaching a substrate detached from the first liquid crystal panel and a substrate detached from the second liquid crystal panel to each other. The first liquid crystal panel includes a first sealant portion, while the second liquid crystal panel includes a second sealant portion. The reuse-panel manufacturing process includes forming a third sealant portion by a sealant-portion forming process. The third sealant portion is formed on one of the substrate detached from the first liquid crystal panel and the substrate detached from the second liquid crystal panel. The third sealant portion is located differ in position from both of the first sealant portion on the first liquid crystal panel and the second sealant portion on the second liquid crystal panel.

The present method can achieve the reuse of substrates detached from a defective liquid crystal panel, i.e., from any one of the first liquid crystal panel and the second liquid crystal panel having been manufactured and having a defect. Specifically, the reuse-panel manufacturing process uses a substrate detached from the first liquid crystal panel and a substrate detached from the second liquid crystal panel, and forms the third sealant portion on one of the substrates. At the time, the third sealant portion is located to differ in position from both of the first sealant portion and the second sealant portion. According to the construction, the first or second sealant portion having been ripped at the time of the detachment is not required to be completely removed from the substrates. Consequently, the manufacturing cost for the third liquid crystal panel to be manufactured by reuse of the substrates can be reduced. Further, compared to the conventional method including double sealing, the first and second liquid crystal panels can be also manufactured at low cost, because a process of forming a sealant portion is performed only once for each liquid crystal panel that will be manufactured by the panel manufacturing process and be identified as a non-defective product.

BRIEF DESCRIPTION OF THE DRAWINGS

FIG. 1 is an exploded view showing an overview of a television receiver according to an embodiment 1 of the present invention;

FIG. 9 is an enlarged sectional view showing an uncompleted third liquid crystal panel, on which a third sealant portion is still not formed;

BEST MODE FOR CARRYING OUT THE INVENTION

Embodiment 1

An embodiment 1 according to the present invention will be explained with reference to FIGS. 1 to 13. In the present embodiment, a liquid crystal panel 10 included in a liquid crystal display device D will be illustrated.

Figure 2:
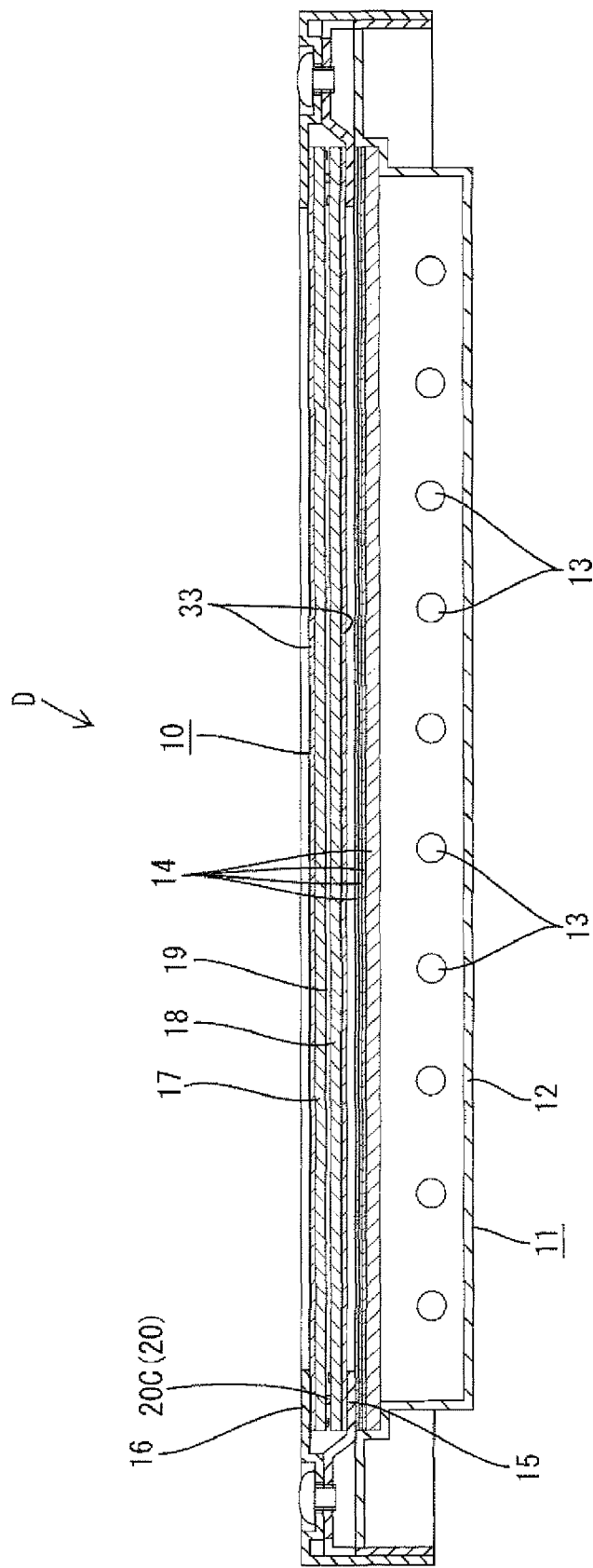
FIG. 2 is a sectional view showing an overview of a liquid crystal display device.

Referring to FIG. 2, the liquid crystal display device D forms a horizontally-long rectangular shape as a whole, which includes the liquid crystal panel 10 as a display panel capable of image display and further includes a backlight 11 that is disposed on the rear side (or back-surface side) of the liquid crystal panel 10 as an external light source (or a lighting device) capable of illuminating the liquid crystal panel 10. The liquid crystal display device D can be applied to a television receiver TV. As shown in FIG. 1, the television receiver TV includes the liquid crystal display device D, and front and back cabinets Ca and Cb capable of holding the liquid crystal display device 13 therebetween. Further included are a power source P, a tuner T for broadcast reception such as TV reception, and a stand S.

The backlight 11 will be briefly explained first. Referring to FIG. 2, the backlight 11 includes a casing 12 having a substantially box-like shape with a front-side (i.e., liquid crystal panel 10 side) opening, a plurality of linear light sources 13 (e.g., cold cathode tubes) arranged parallel to one another in the casing 12, a plurality of optical members 14 arranged in a stack (e.g., a diffuser plate, a diffusing sheet, a lens sheet and a brightness enhancement sheet, arranged in this order from the back side) in the opening of the casing 12, and a rectangular-shaped frame 15 for holding the optical members 14 together with the casing 12 and therebetween. The optical members 14 have functions such as a function for converting light from each linear light source 13 into flat light. The frame 15 can function also as a support member for supporting the liquid crystal panel 10 from the back side. A frame-like bezel 16 (or a holding member) is mounted on the front side of the liquid crystal panel 10, so as to bear down on the liquid crystal panel 10. The liquid crystal panel 10 is thus held between the support member and the holding member.

Next, the liquid crystal panel 10 will be explained in detail. The liquid crystal panel 10 includes a pair of transparent (or light transmissive) glass substrates 17, 18 having a horizontally-long rectangular shape, and further includes a liquid crystal layer 19 disposed between the substrates 17, 18. The liquid crystal layer 19 is formed of a liquid crystal material with an optical property that changes with applied voltage. The liquid crystal panel 10 further includes a sealant portion 20 that is disposed between the substrates 17, 18 so as to surround and seal the liquid crystal layer 19 (or, hold that in a liquid tight state). The sealant portion 20 is located on the substrates 17, 18 so as to be in the frame area (or non-display area) that is provided on the radially outer side of the display area capable of image display. The sealant portion 20 is circumferentially provided to form a substantially rectangular shape along the peripheral edges of the substrates 17, 18. The sealant portion 20 is formed of a sealant, e.g., made of a thermoset resin material that hardens when heated, or a light curing resin material that hardens when irradiated with light (ultraviolet or visible light). The substrates 17, 18 are attached to each other so as to face each other, while a gap (or interval) of a predetermined size is kept therebetween.

Figure 5:
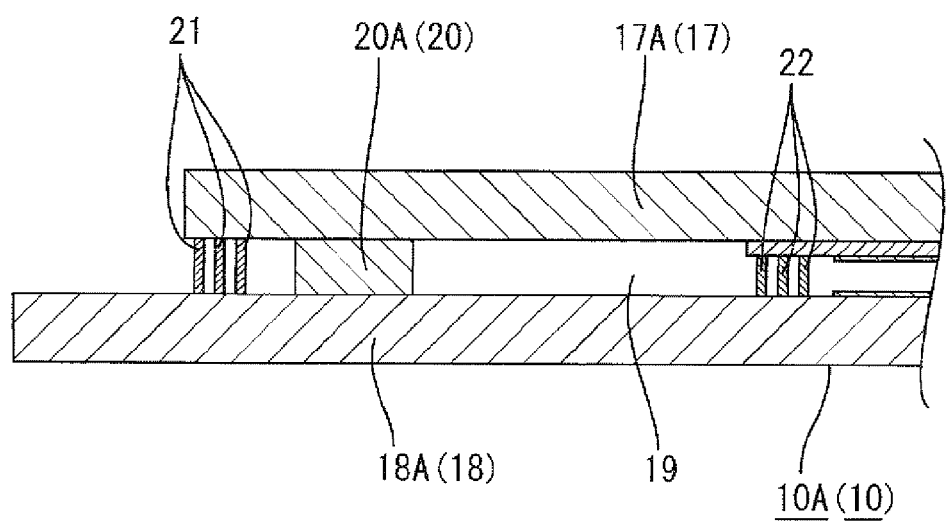
FIG. 5 is an enlarged sectional view of a part of a first liquid crystal panel, which corresponds to a peripheral area of the screen.
Figure 11:
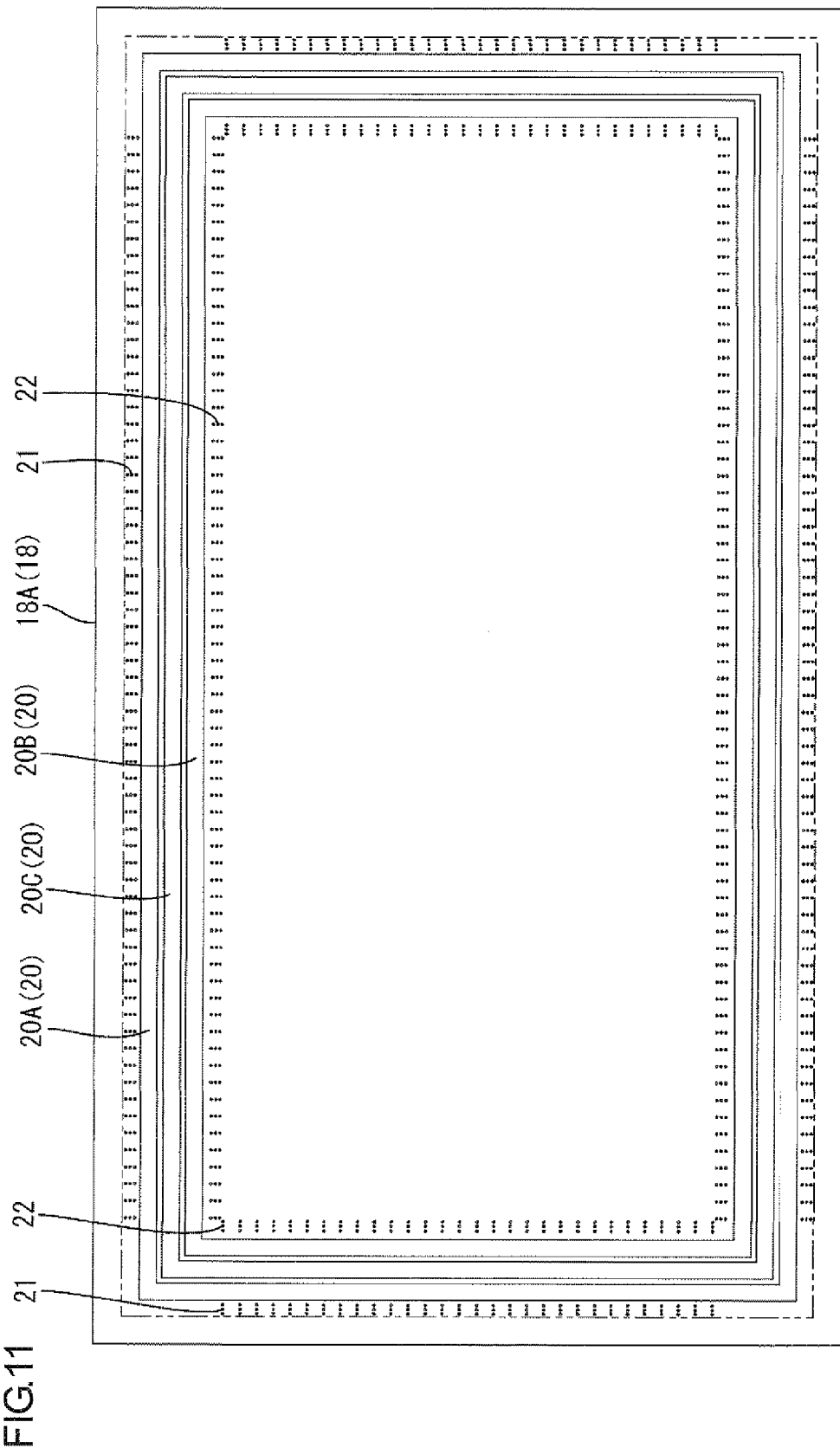
FIG. 11 is a plan view showing when the third sealant portion has been formed on the array substrate.

Referring to FIG. 5, spacer portions 21, 22 are provided between the substrates 17, 18 so as to maintain the gap between the substrates 17, 18, which are located at the radially outer side and the radially inner side of the sealant portion 20, respectively. The spacer portions 21, 22 individually have a pillar shape, and are arranged so that a plurality (e.g., three in the figure) of spacer portions arranged in the radial direction are provided at each of the radially outer and inner sides. As shown in FIG. 11, the spacer portions 21, 22 include a number of spacer portions arranged in the extending directions of the sealant portion 20. Further, a number of spacer materials (not shown) are provided to scatter in the liquid crystal layer 19, and thereby the gap between the substrates 17, 18 is maintained at the central area.

Figure 3:
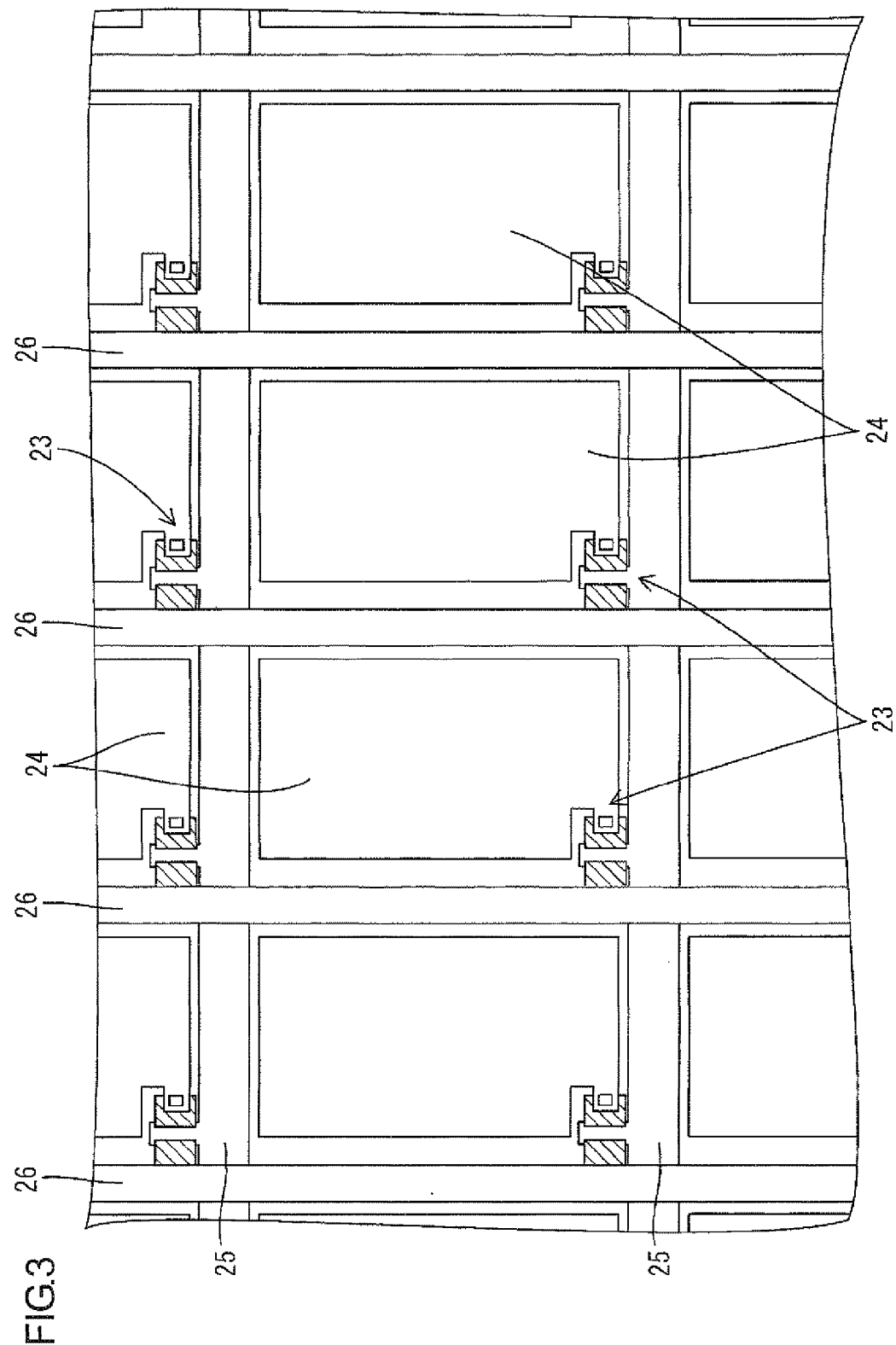
FIG. 3 is an enlarged plan view of an array substrate included in a liquid crystal panel.
Figure 4:
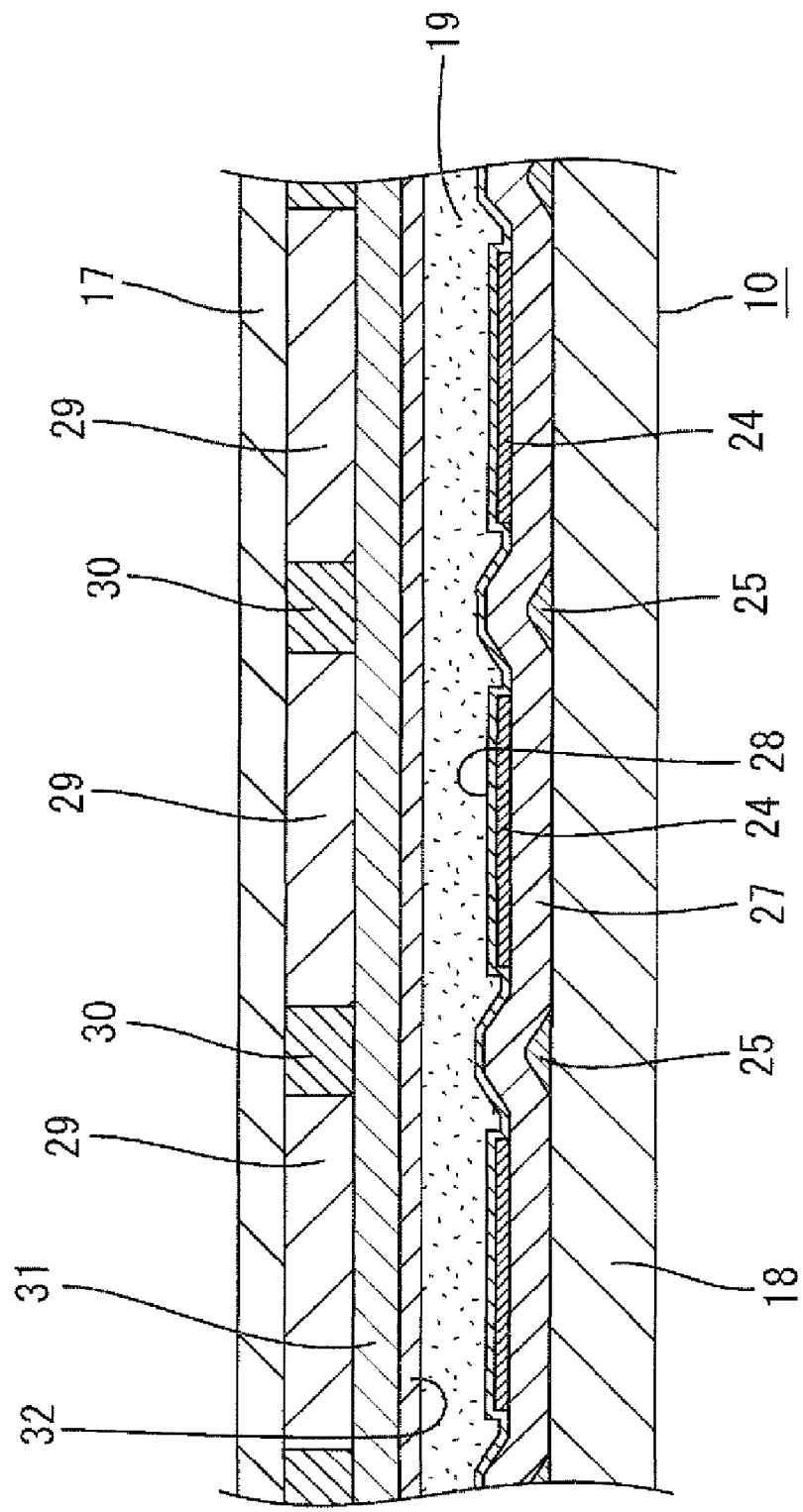
FIG. 4 is an enlarged sectional view of a part of the liquid crystal panel, which corresponds to the central area of the screen.

The front-side one (or obverse-side one) of the substrates 17, 18 is provided as a of substrate 17, while the back-side one (or reverse-side one) is provided as an array substrate 18. On the inner surface side (i.e., liquid crystal layer side or of substrate 17 facing surface side) of the array substrate 18, as shown in FIG. 3, a number of TFTs 23 (Thin Film Transistors) as switching elements and pixel electrodes 24 are arranged, and further gate wiring lines 25 and source wiring lines 26 are arranged in a grid pattern so as to surround the TFTs 23 and the pixel electrodes 24. The pixel electrode 24 is connected to the drain electrode of the TFT 23. The source wiring line 26 is connected to the source electrode of the TFT 23, while the gate wiring line 25 is connected to the gate electrode of the TFT 23. Each pixel electrode 24 is formed of a transparent electrode, e.g., made of ITO (Indium Tin Oxide) or ZnO (Zinc Oxide). As shown in FIG. 4, an insulating layer 27 is provided on the surfaces of the array substrate 18 and the gate wiring lines 25. The pixel electrodes 24 are provided on the surface of the insulating layer 27. Further, an alignment film 28 for directional alignment of the liquid crystal layer 19 is provided on the surfaces of the pixel electrodes 24.

On the other hand, as shown in FIG. 4, a number of colored films 29 constituting the color filter are arranged on the CF substrate 17 so as to correspond to the respective pixels. The color filter includes colored films 29 of three colors, i.e., R, G and B films, which are arranged in cyclic order. A light blocking layer 30 (black matrix) for preventing color mixture is provided between the colored films 29 of the color filter. A counter electrode 31 is provided on the surfaces of the light colored films 29 and the light blocking layer 30, so as to be opposite to the pixel electrodes 24 provided on the array substrate 18. An alignment film 32 for directional alignment of the liquid crystal layer 19 is provided on the surface of the counter electrode 31. Further, a pair of front and back polarizing plates 33 are attached on the outer surface sides of the respective substrates 17, 18, as shown in FIG. 2.

The liquid crystal panel 10 having the above construction can be manufactured as follows. The array substrate 18 and the CF substrate 17 are first prepared in a known manner. Then, spacer portions 21 are formed on the CF substrate 17 or one of the substrates 17, 18, while a sealant is applied to the array substrate 18 so as to form a sealant portion 20. At the time, the sealant is applied to the array substrate 18 using a dispenser not shown, and thereby a predetermined shape is drawn. Thereafter, a proper quantity of liquid crystal material is dropped on the array substrate 18 having the sealant. Then, the CF substrate 17 is aligned with the array substrate 18, and is attached thereto. Consequently, a liquid crystal layer 19 is provided to be sandwiched between the substrates 17, 18. Thereafter, heat or light is applied to the sealant, in order to harden the sealant. Thereby, the substrates 17, 18 having been attached to each other are firmly fixed. At the time of the attachment, the spacer portions 21 on the CF substrate 17, or specifically, the distal ends thereof can have contact with the inner surface of the array substrate 18, and thereby a gap of the predetermined size is maintained between the substrates 17, 18. Further, polarizing plates 33 are attached to the outer surface sides of the respective substrates 17, 18.

After having been manufactured as above, the liquid crystal panel 10 undergoes an inspection process, and thereby is checked for defects. Conventionally, the liquid crystal panel 10 is rejected when a defect has been found in the liquid crystal panel 10 by the inspection process. Sometimes defects may be found solely in one of the substrates 17, 18, and sometimes defects may be found in both of the substrates 17, 18. Some of these defects are repairable. In some cases, defects may be found in the liquid crystal layer 19 but cannot be found in the substrates 17, 18. In theses circumstances, the rejection of the liquid crystal panel 10 simply due to a defect can lead to waste of the substrates 17, 18. However, in order to enable reuse of the substrates 17, 18, the substrates 17, 18 should be detached and further the sealant portion 20 should be completely removed from the substrates 17, 18. The complete removal is practically difficult because the sealant portion 20 is firmly fixed to the substrates 17, 18.

In this connection, a technique for achieving the reuse of substrates is conventionally provided, which proposes that two substrates are attached to each other via a thermoplastic sealant portion, and after the subsequent inspection of the resultant structure, a non-thermoplastic sealant portion for adhesion improvement is further formed on the outer side of the thermoplastic sealant portion if the inspection identifies the structure as a non-defective product. In the case of a defective product, the thermoplastic sealant portion is softened by heat, and thereby the substrates are detached for reuse.

However, this technique may be associated with increase in the number of processes and therefore in cost, because double sealing is required for all the liquid crystal panels to be manufactured. Further, in a process of reusing the substrates, the thermoplastic sealant portion should be completely removed from the detached substrates. Although it is easier to remove than an ordinary or thermoset sealant, the complete removal may require time and cost.

In order to solve the above problems, the present embodiment employs the following manufacturing method. A brief explanation is as follows: Liquid crystal panels 10 manufactured by a panel manufacturing process purposely include two kinds of liquid crystal panels 10A and 10B, which differ from each other in position of the sealant portion 20A, 20B to be formed thereon. When defects have been found in the first liquid crystal panel 10A and the second liquid crystal panel 10B by an inspection process, the substrates 17, 18 are detached from the liquid crystal panels 10A, 10B by a substrate detachment process, and are reused by a reuse-panel manufacturing process so as to newly form a third liquid crystal panel 10C. Next, the manufacturing method will be explained in detail.

Hereinafter, when the constructions associated with the respective liquid crystal panels should be distinguishably designated, the suffix "A" is attached to the symbols of the constructions associated with the first liquid crystal panel, while the suffix "B" is attached to the symbols of the constructions associated with the second liquid crystal panel. The suffix "C" is attached to the symbols of the constructions associated with the third liquid crystal panel. The suffix is omitted when the constructions are collectively designated without discrimination.

Figure 6:
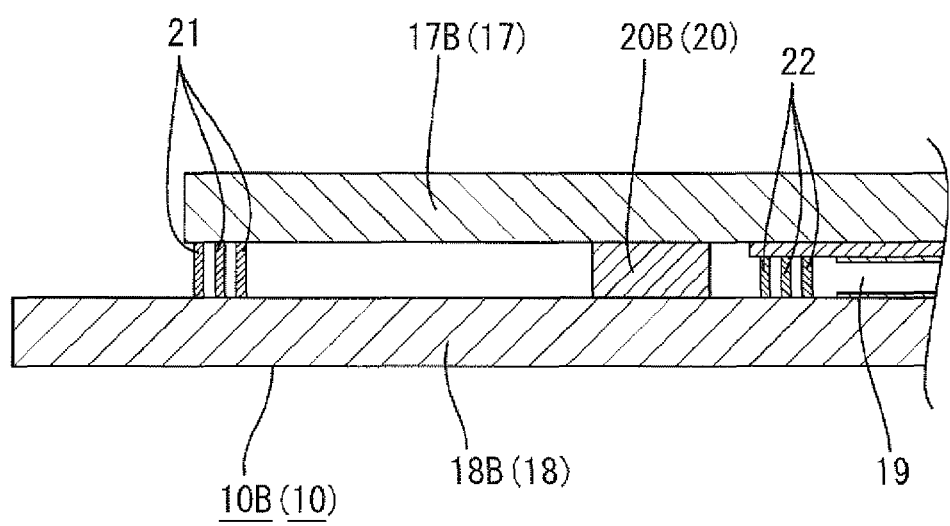
FIG. 6 is an enlarged sectional view of a part of a second liquid crystal panel, which corresponds to a peripheral area of the screen.

Referring to FIG. 5, the first liquid crystal panel 10A to be manufactured by the panel manufacturing process includes a first sealant portion 20A that is located near the spacer portions 21 provided on the radially outer side. In contrast, referring to FIG. 6, the second liquid crystal panel 10B includes a second sealant portion 20B that is located near the spacer portions 22 provided on the radially inner side. That is, the sealant portions 20A and 20B are located (at different positions) so as to be displaced from each other in the radial direction of the substrates 17, 18. On the first liquid crystal panel 10A, a space of a predetermined size is left at the radially inner side of the first sealant portion 20A as shown in FIG. 5, which can be provided as a space for escape of the ripped second sealant portion 20B and as a space for a third sealant portion 20C, as will be explained later. Similarly, on the second liquid crystal panel 10B, a space of a predetermined size is left at the radially outer side of the second sealant portion 20B as shown in FIG. 6, which can be provided as a space for escape of the ripped first sealant portion 20A and as a space for a third sealant portion 20C, as will be explained later. That is, on the first and second liquid crystal panels 10A, 10B, spaces are provided to allow three sealant portions 20A, 20B, 20C to be arranged thereon at positions displaced from one another in the radial direction (See FIG. 11). Note that the manufacturing method for the liquid crystal panels 10A, 10B can be implemented as described above.

When the first liquid crystal panel 10A and the second liquid crystal panel 10B have been manufactured so as to have the respective sealant portions 20A, 20B as described above, the liquid crystal panels 10A, 10B are checked for defects by the inspection process. The liquid crystal panel having been identified as a non-defective product by the inspection process is forwarded to an assembling process where other components such as a backlight 11 and a bezel 16 are mounted thereto. On the other hand, when a defect has been found, the liquid crystal panel is identified as a defective product, and is forwarded to a substrate detachment process if the substrate 17 or 18 is reusable. The substrate 17, 18 can be identified as a reusable substrate, if the substrate 17, 18 has no defects (i.e., when the determination of the defective product is due to defects in other members such as the other substrate or the liquid crystal layer 19) or if the substrate 17, 18 has a repairable defect. Therefore, sometimes one of the two substrates 17, 18 of the liquid crystal panel 10 may be reusable, and sometimes both of the substrates 17, 18 may be reusable. The liquid crystal panel 10 having no reusable substrate 17, 18 is remediless, and therefore is discarded. Examples of the defects include defects in the TFTs 23, pixel electrodes 24, gate wiring lines 25, source wiring lines 26, insulating layer 27, or alignment film 28 on the array substrate 18, and further includes defects in the colored films 29, light blocking layer 30, counter electrode 31, or alignment film 32 on the CF substrate 17. Further, defects in the liquid crystal layer 19 (e.g., due to intrusion of a foreign substance) can be included.

Figure 7:
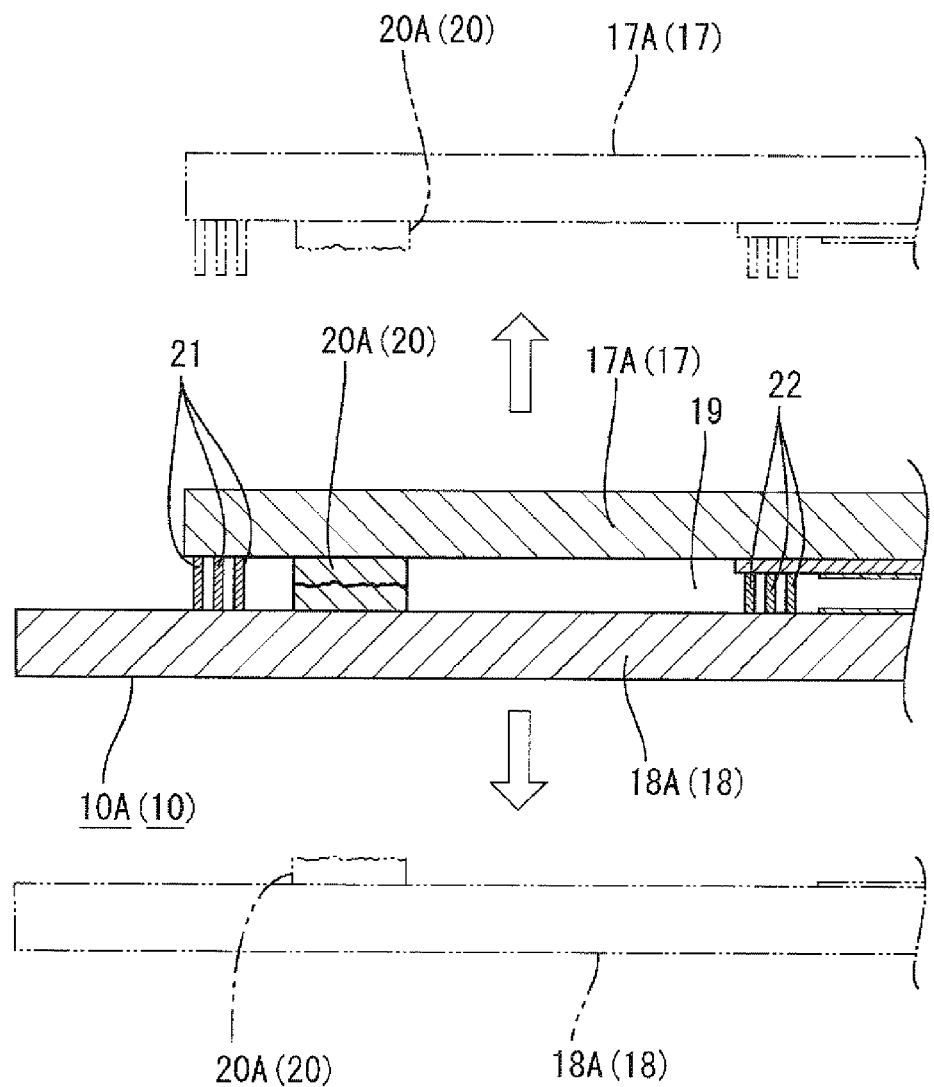
FIG. 7 is an enlarged sectional view showing a process of detaching the substrates from the first liquid crystal panel.
Figure 8:
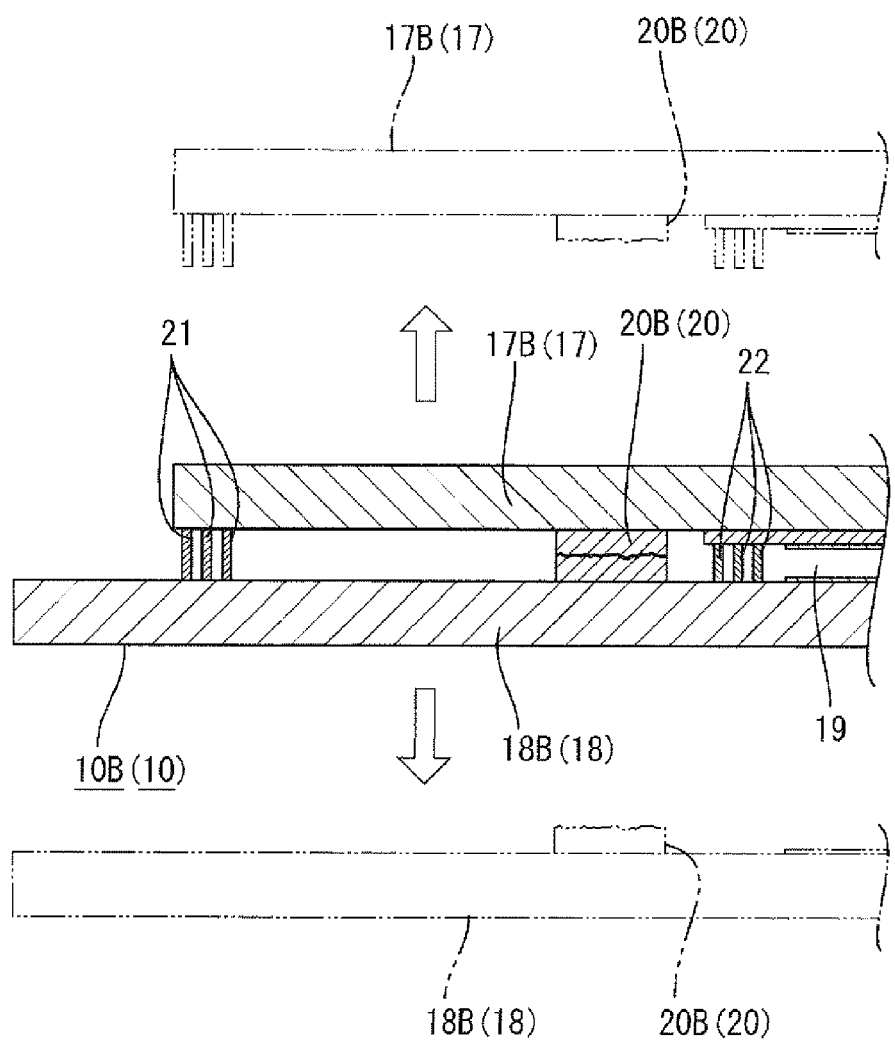
FIG. 8 is an enlarged sectional view showing a process of detaching the substrates from the second liquid crystal panel.

In the substrate detachment process, referring to FIGS. 7 and 8, a solvent (e.g., water or alcohol) is applied to the sealant portion 20 so as to swell and soften the sealant portion 20. Then, the substrates 17, 18 can be detached while the sealant portion 20 is ripped as shown by two-dot chain lines in the figures. Note that the process for swelling and softening of the sealant portion 20 should be performed after detachment of polarizing plates 33 if the substrates 17, 18 have polarizing plates 33 attached thereto. The detached substrates 17, 18 are once cleaned to remove the liquid crystal material attached to the inner surface thereof or the solvent having been used for swelling of the sealant portion 20. If the detached substrates 17, 18 include a repairable substrate, it is forwarded to the reuse-panel manufacturing process via a repair process. The substrate having no defects is forwarded to the reuse-panel manufacturing process. Note that the ripped sealant portion 20 is still left on the detached substrates 17, 18. The irreparable substrate 17, 18 is discarded.

Figure 10:
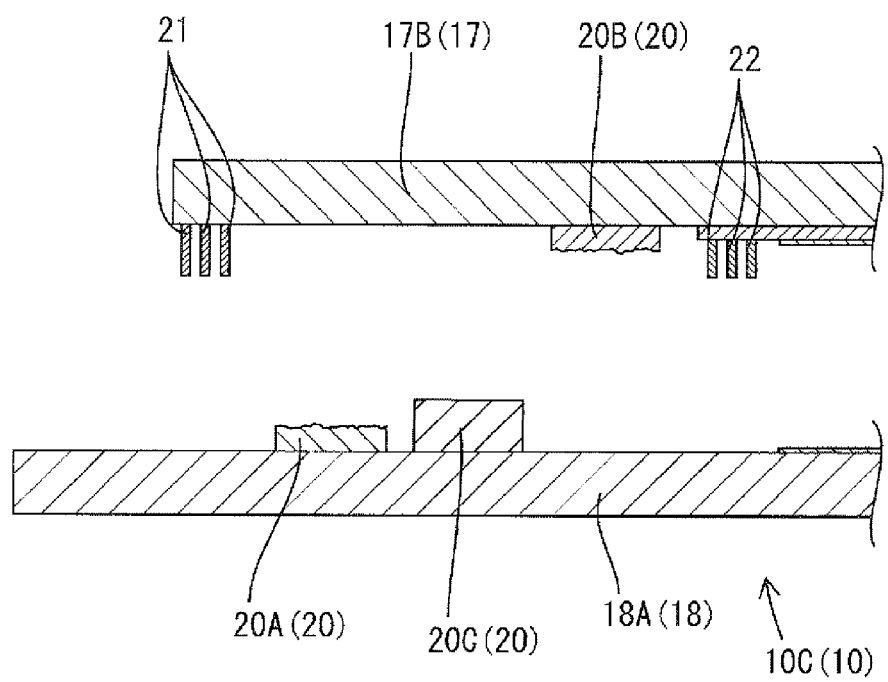
FIG. 10 is an enlarged sectional view showing when the third sealant portion has been formed on the array substrate.

In the reuse-panel manufacturing process, a third liquid crystal panel 10C is manufactured using reusable substrates 17, 18 having been detached from the liquid crystal panels 10A, 10B. Specifically, referring to FIG. 9, an array substrate 18A detached from the first liquid crystal panel 10A and a CF substrate 17B detached from the second liquid crystal panel 10B are prepared, for example. Then, a sealant is applied to the array substrate 18A (by a sealant-portion forming process), so as to form a third sealant portion 20C as shown in FIG. 10. Referring to FIG. 11, the third sealant portion 20C formed by the sealant-portion forming process is located to be displaced to the radially inner side from the first sealant portion 20A left on the array substrate 18A and to be displaced to the radially outer side from the second sealant portion 20B left on the CF substrate 17B. Thereby, the third sealant portion 20C can be prevented from interfering (or overlapping) with the remaining first or second sealant portion 20A, 20B.

Figure 12:
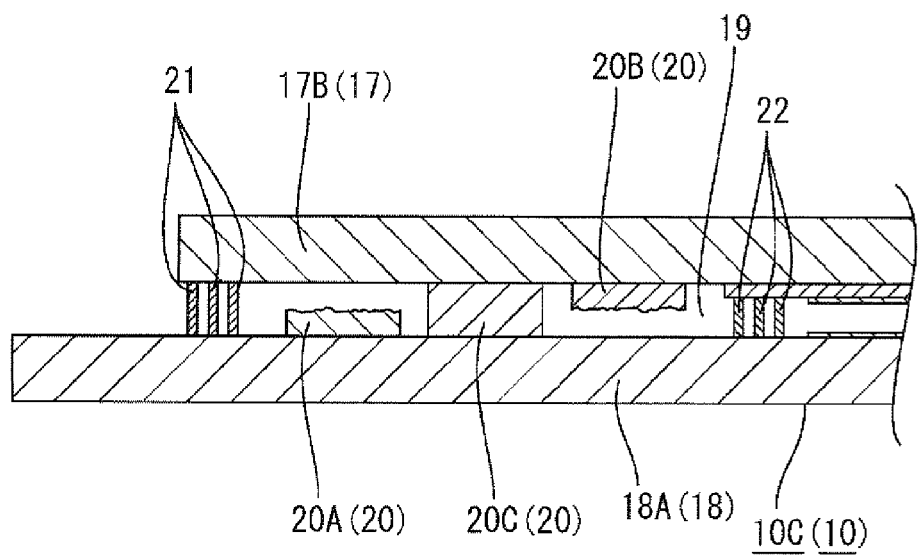
FIG. 12 is an enlarged sectional view of the third liquid crystal panel formed by attaching the substrates to each other.

Thereafter, a proper quantity of liquid crystal material is dropped on the array substrate 18A. Then, the substrates 17B, 18A are aligned with and attached to each other, as shown in FIG. 12. Consequently, a liquid crystal layer 19 is provided to be sandwiched between the substrates 17B, 18A. Thereafter, heat or light is applied to the sealant of the third sealant portion 20C, in order to harden the sealant. Thereby, the substrates 17B, 18A having been attached to each other are firmly fixed. At the time of the attachment, the spacer portions 21, 22 on the CF substrate 17B, or specifically, the distal ends thereof can have contact with the array substrate 18A, and thereby a gap of the predetermined size is maintained between the substrates 17B, 18A. Further, polarizing plates 33 are attached to the respective substrates 17B, 18A. Thus, the third liquid crystal panel 10C can be manufactured.

Figure 13:
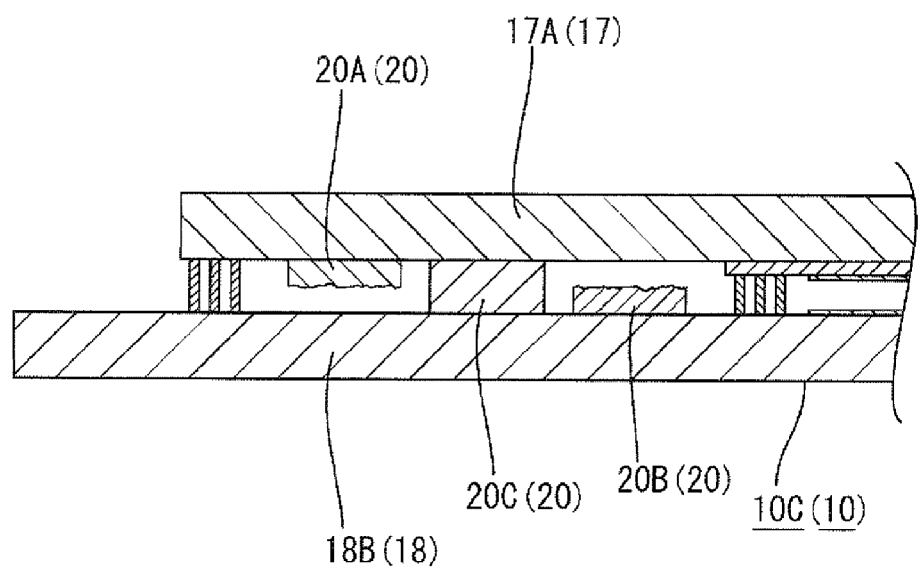
FIG. 13 is an enlarged sectional view of another third liquid crystal panel formed by attaching a CF substrate detached from the first liquid crystal panel and an array substrate detached from the second liquid crystal panel to each other.

Obviously, a third liquid crystal panel 10C can be also manufactured using a CF substrate 17A detached from the first liquid crystal panel 10A and an array substrate 18B detached from the second liquid crystal panel 10B, as shown in FIG. 13.

Note that the third sealant portion 20C is located on the third liquid crystal panel 10C so as to be between the first and second sealant portions 20A, 20B (or be displaced from the both) as shown in FIG. 11. According to the construction, the first or second sealant portion 20A, 20B is not required to be completely removed from the substrates 17A, 18A detached from the first liquid crystal panel 10A or from the substrates 17B, 18B detached from the second liquid crystal panel 10B. Consequently, the manufacturing cost for the third liquid crystal panel 10C to be manufactured by the reuse of the substrates 17, 18 can be reduced.

As explained above, a manufacturing method of a liquid crystal panel 10 according to the present embodiment includes manufacturing a first liquid crystal panel 10A and a second liquid crystal panel 10B by a panel manufacturing process. The first liquid crystal panel 10A and the second liquid crystal panel 10B differ from each other in position of the sealant portion 20A, 20B to be formed thereon. The manufacturing method further includes detaching the substrates 17, 18 from a defective liquid crystal panel by a substrate detachment process. The defective liquid crystal panel is any one of the first liquid crystal panel 10A and the second liquid crystal panel 10B that includes a defect. The manufacturing method further includes manufacturing a third liquid crystal panel 10C by a reuse-panel manufacturing process. The third liquid crystal panel 10C is formed by attaching a substrate 18A (or 17A) detached from the first liquid crystal panel 10A and a substrate 17B (or 18B) detached from the second liquid crystal panel 10B to each other. The first liquid crystal panel 10A includes a first sealant portion 20A, while the second liquid crystal panel 10B includes a second sealant portion 20B. The reuse-panel manufacturing process includes forming a third sealant portion 20C by a sealant-portion forming process. The third sealant portion 20C is formed on one of the substrate 18A (or 17A) detached from the first liquid crystal panel 10A and the substrate 17B (or 18B) detached from the second liquid crystal panel 10B. The third sealant portion 20C is located to differ in position from both of the first sealant portion 20A on the first liquid crystal panel 10A and the second sealant portion 20B on the second liquid crystal panel 10B. According to the construction, the first or second sealant portion 20A, 20B having been ripped at the time of the detachment from the first or second liquid crystal panel 10A, 10B is not required to be completely removed from the substrates. Consequently, the manufacturing cost for the third liquid crystal panel 10C to be manufactured by the reuse of the substrates 17, 18 can be reduced. Further, compared to the conventional method including double sealing, the first and second liquid crystal panels 10A, 10B can be also manufactured at low cost, because a process of forming a sealant portion 20A, 20B is performed only once for each liquid crystal panel that will be manufactured by the panel manufacturing process and be identified as a product having no defects (or, as a non-defective product).

The first or second liquid crystal panel 10A, 10B to be manufactured by the panel manufacturing process includes space portions 21, 22 on the CF substrate 17 or on one of the substrates 17, 18, so that a gap is maintained between the substrates 17, 18. The spacer portions 21, 22 can be reused by the reuse-panel manufacturing process so as to maintain a gap between the substrates 17, 18 to be attached to each other by the reuse-panel manufacturing process. Thus, the reuse of the spacer portions 21, 22 formed by the panel manufacturing process can be achieved. Further, the spacer portions 21, 22 on the CF substrate 17 can be readily provided, because the CF substrate 17 is superior in surface flatness compared to the array substrate 18 having TFTs 23 and pixel electrodes 24 formed thereon.

Moreover, the spacer portions 21, 22 formed by the panel manufacturing process are located to be capable of being arranged on the inner and outer sides of the third sealant portion 20C to be formed by the reuse-panel manufacturing process. Thereby, the gap between the substrates 17, 18 can be maintained more stably.

Embodiment 2

Figure 14:
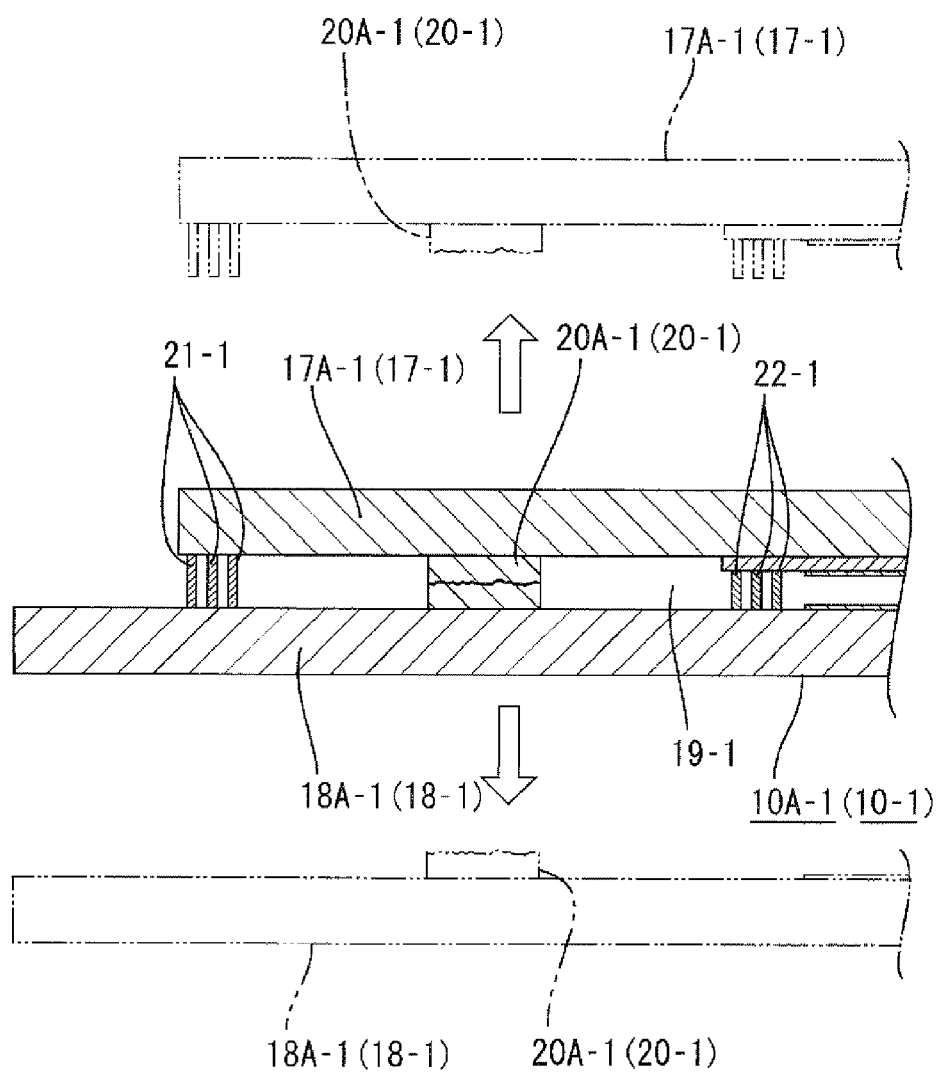
FIG. 14 is an enlarged sectional view showing a process of detaching the substrates from a first liquid crystal panel according to an embodiment 2 of the present invention.
Figure 15:
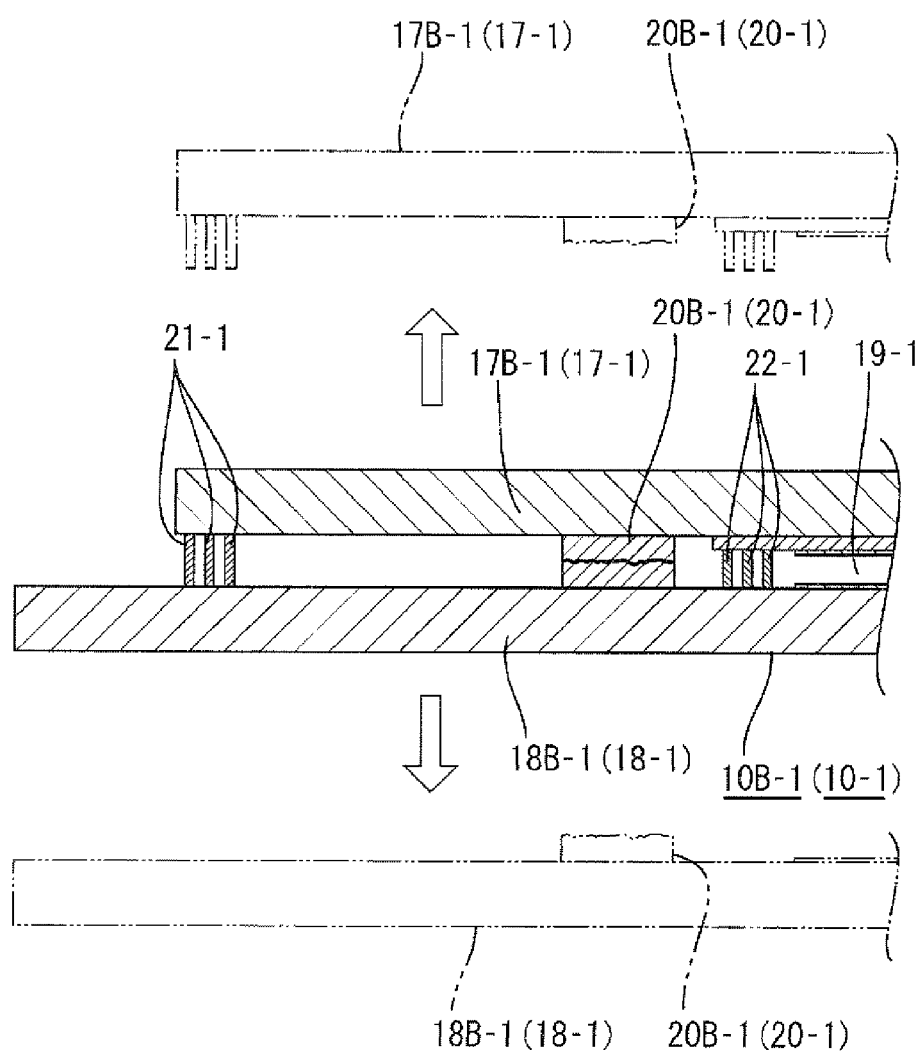
FIG. 15 is an enlarged sectional view showing a process of detaching the substrates from a second liquid crystal panel.

An embodiment 2 of the present invention will be explained with reference to FIGS. 14 to 16. The present embodiment 2 shows a modification in which the positions of sealant portions are changed. In the present embodiment 2, the parts called by the same names as those of the above embodiment 1 are designated by the same symbols, but the suffix "-1" is attached thereto. The redundant explanations for the constructions and operational effects will be omitted.

On first and second liquid crystal panels 10A-1, 10B-1 to be manufactured by a panel manufacturing process, the sealant portions 20A-1, 20B-1 are located as follows. Referring to FIG. 14, the first sealant portion 20A-1 is located on the first liquid crystal panel 10A-1 so as to be at the middle position between spacer portions 21-1, 22-1 provided on the radially inner and outer sides. That is, it is located at the position corresponding to the position of the third sealant portion 20C of the embodiment 1. On the other hand, referring to FIG. 15, the second sealant portion 20B-1 is located on the second liquid crystal panel 10B-1 so as to be near the spacer portions 22-1 provided on the radially inner side. That is, it is located at the same position as that of the embodiment 1. On a third liquid crystal panel 10C-1 to be manufactured by a reuse-panel manufacturing process, referring to FIG. 16, the third sealant portion 20C-1 is located to be near the spacer portions 21-1 provided on the radially outer side. That is, it is located at the position corresponding to the position of the first sealant portion 20A of the embodiment 1.

Hereinafter, a manufacturing procedure, which is similar to that of the embodiment 1, will be briefly explained. First and second liquid crystal panels 10A-1, 10B-1 are manufactured by a panel manufacturing process, and are checked by an inspection process. The liquid crystal panel 10A-1, 10B-1 having a reusable substrate 17-1 or 18-1 is forwarded to a substrate detachment process. In the substrate detachment process, the substrates 17-1, 18-1 are detached as shown by two-dot chain lines in FIGS. 14 and 15, which are then forwarded to a reuse-panel manufacturing process. In the reuse-panel manufacturing process, a third sealant portion 20C-1 is formed on the array substrate 18A-1 or one of the detached substrates 17B-1, 18A-1 by a sealant-portion forming process, and thereafter a liquid crystal material is dropped on the array substrate 18A-1. Then, the substrates 17B-1, 18A-1 are attached to each other, and the third sealant portion 20C-1 is hardened. Consequently, the third liquid crystal panel 10C-1 can be obtained as shown in FIG. 16.

On the third liquid crystal panel 10C-1, the third sealant portion 20C-1 is radially located to be lateral to both of the first and second sealant portions 20A-1, 20B-1 left on the respective substrates 17B-1, 18A-1. Note that the liquid crystal layer 19-1 was once formed on the area of the reusable substrate 17B-1, 18A-1 on the radially inner side of the first or second sealant portion 20A-1, 20B-1 by the panel manufacturing process so as not to extend to the areas on the radially outer side of the first or second sealant portion 20A-1, 20B-1. That is, the area of the substrate 17B-1 or 18A-1 saved for formation of the third sealant portion 20C-1 has no history of having contact with the liquid crystal material of the liquid crystal layer 19-1 formed during the manufacturing process. Therefore, wettability for formation of the third sealant portion 20C-1 on the substrate 17B-1, 18A-1 can be improved, which facilitates the formation of the third sealant portion 20C-1. However, the wettability can be improved by prior cleaning of the substrate, even if the third sealant portion is to be formed on the area of the substrate that has a history of having contact with the liquid crystal material provided during the manufacturing process, as in the embodiment 1 or an embodiment 3 below.

Figure 16:
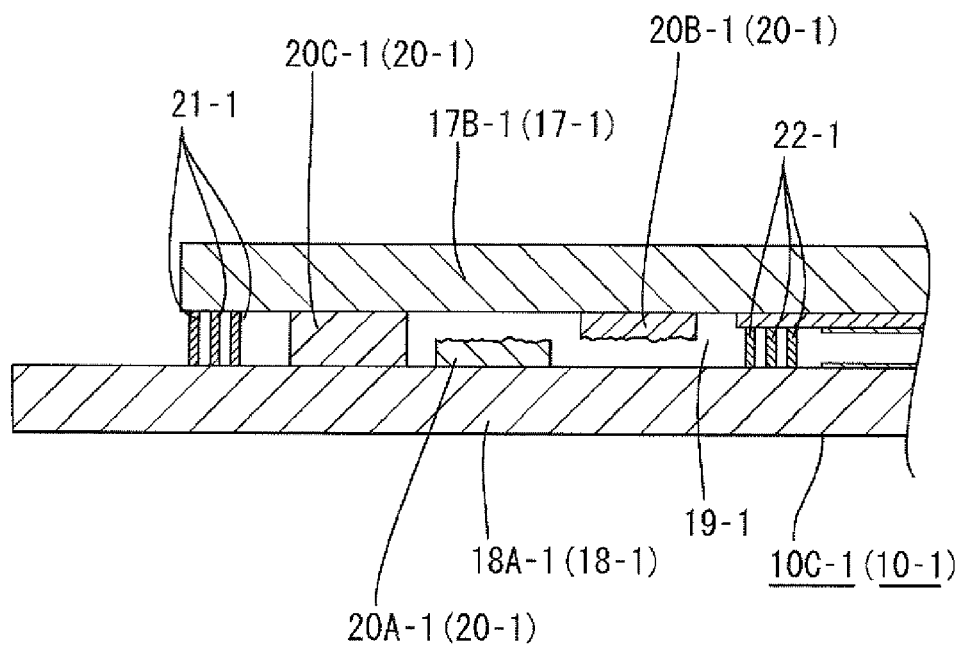
FIG. 16 is an enlarged sectional view of a third liquid crystal panel formed by attaching the detached substrates to each other.

FIG. 16 shows the third liquid crystal panel 10C-1 that is manufactured using an array substrate 18A-1 detached from the first liquid crystal panel 10A-1 and a CF substrate 17B-1 detached from the second liquid crystal panel 10B-1. However, conversely, a third liquid crystal panel 10C-1 may be manufactured using a CF substrate 17A-1 detached from the first liquid crystal panel 10A-1 and an array substrate 18B-1 detached from the second liquid crystal panel 10B-1.

Embodiment 3

Figure 17:
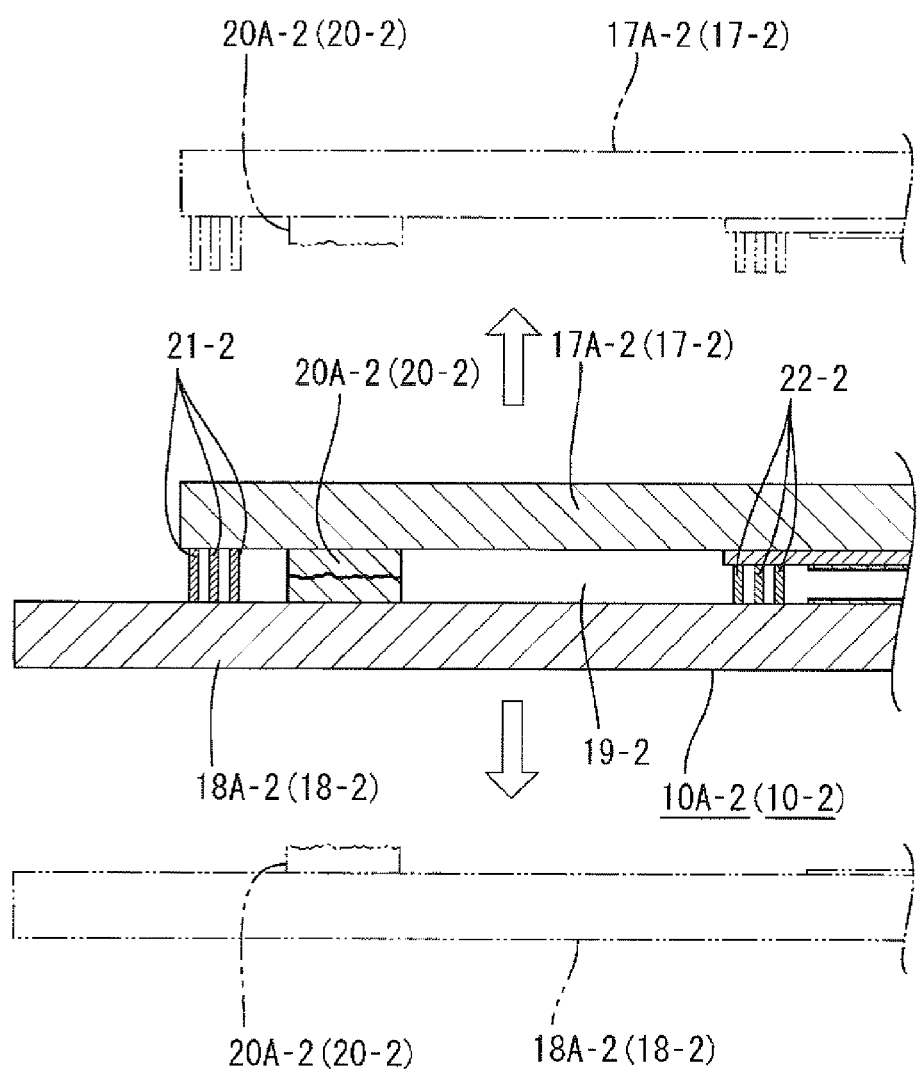
FIG. 17 is an enlarged sectional view showing a process of detaching the substrates from a first liquid crystal panel according to an embodiment 3 of the present invention.
Figure 18:
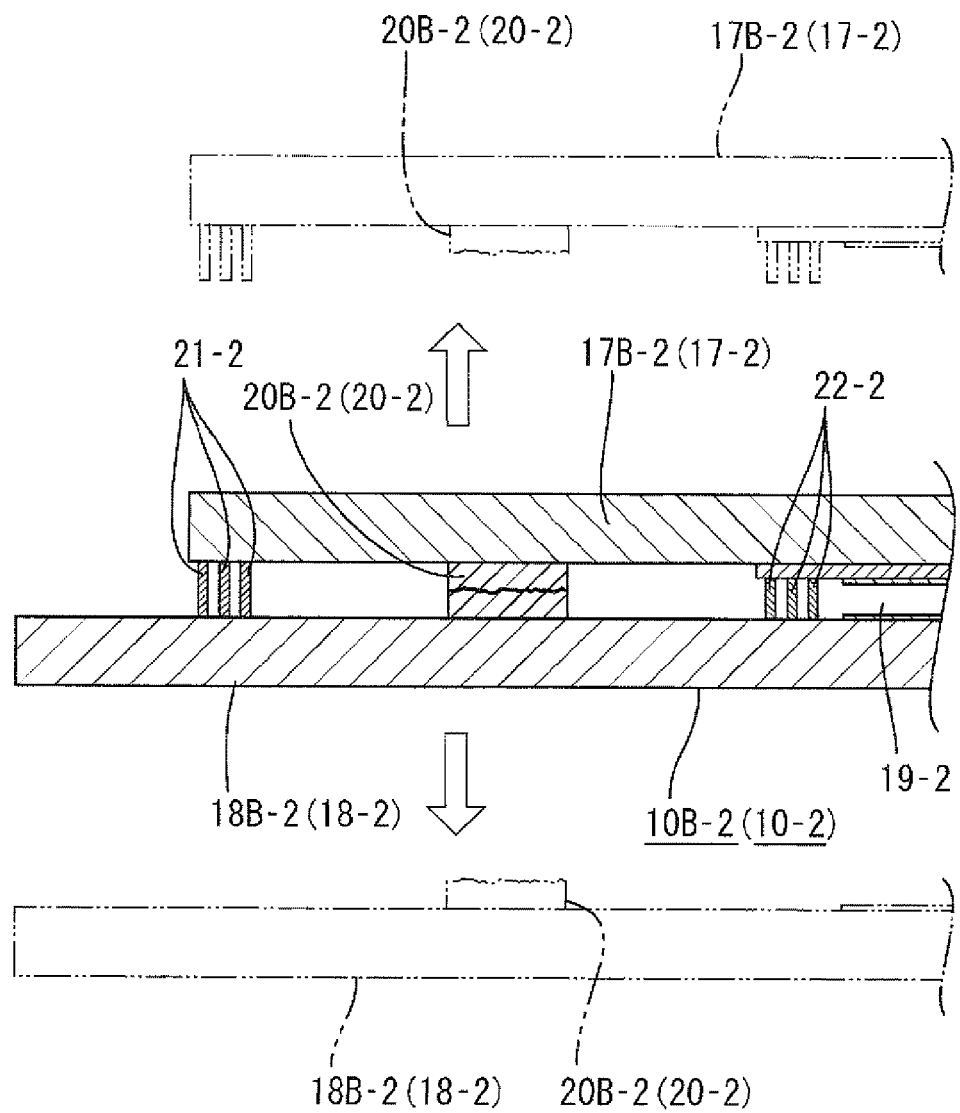
FIG. 18 is an enlarged sectional view showing a process of detaching the substrates from a second liquid crystal panel.

An embodiment 3 of the present invention will be explained with reference to FIGS. 17 to 19. The present embodiment 3 shows another modification in which the positions of sealant portions are changed. In the present embodiment 3, the parts called by the same names as those of the above embodiment 1 are designated by the same symbols, but the suffix "-2" is attached thereto. The redundant explanations for the constructions and operational effects will be omitted.

On first and second liquid crystal panels 10A-2, 10B-2 to be manufactured by a panel manufacturing process, the sealant portions 20A-2, 20B-2 are located as follows. Referring to FIG. 17, the first sealant portion 20A-2 is located on the first liquid crystal panel 10A-2 so as to be near the spacer portions 21-2 provided on the radially outer side. That is, it is located at the same position as that of the embodiment 1. On the other hand, referring to FIG. 18, the second sealant portion 20B-2 is located on the second liquid crystal panel 10B-2 so as to be at the middle position between the spacer portions 21-2, 22-2 provided on the radially inner and outer sides. That is, it is located at the position corresponding to the position of the third sealant portion 20C of the embodiment 1. On a third liquid crystal panel 10C-2 to be manufactured by a reuse-panel manufacturing process, referring to FIG. 19, the third sealant portion 20C-2 is located to be near the spacer portions 22-2 provided on the radially inner side. That is, it is located at the position corresponding to the position of the second sealant portion 20B of the embodiment 1. A manufacturing procedure is similar to that of the embodiment 2, and therefore the explanation thereof will be omitted.

Note that the solvent having been applied to the first or second sealant portion 20A-2, 20B-2 during the detachment by the substrate detachment process may be left thereon. Further, the detachment may generate ripping scrap. However, according to the present construction, the liquid crystal layer 19 of the third liquid crystal panel 10C-2 can be isolated from the first and second sealant portions 20A-2, 20B-2 remaining after the detachment, because the third sealant portion 20C-2 on the third liquid crystal panel 10C-2 is radially located to be medial to both of the first and second sealant portions 20A-2, 20B-2 (i.e., both of the first and second sealant portions 20A-2, 20B-2 are radially located to be lateral to the third sealant portion 20C-2). Consequently, the liquid crystal layer 19 of the third liquid crystal panel 10C-2 can be prevented from contamination that may be due to a foreign substance caused when the first or second sealant portion 20A-2, 20B-2 is ripped. However, even in the embodiment 1 or 2, adequate cleaning of the detached substrates and the first and second sealant portions thereof can prevent the liquid crystal layer of the third liquid crystal panel from contamination.

Figure 19:
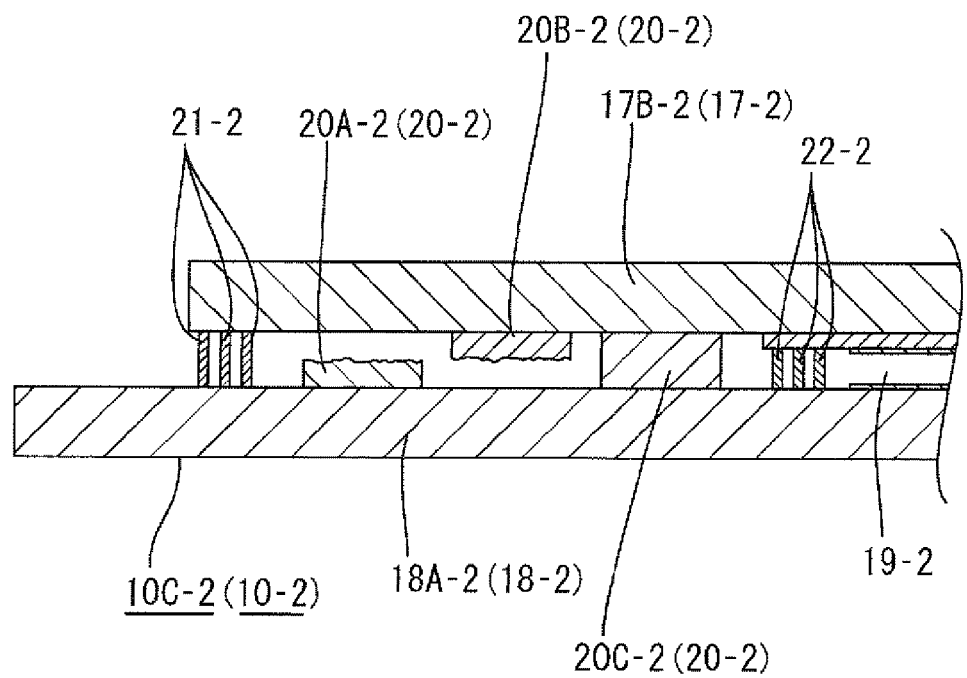
FIG. 19 is an enlarged sectional view of a third liquid crystal panel formed by attaching the detached substrates to each other.

FIG. 19 shows the third liquid crystal panel 10C-2 that is manufactured using an array substrate 18A-2 detached from the first liquid crystal panel 10A-2 and a CF substrate 17B-2 detached from the second liquid crystal panel 10B-2. However, conversely, a third liquid crystal panel 10C-2 may be manufactured using a CF substrate 17A-2 detached from the first liquid crystal panel 10A-2 and an array substrate 18B-2 detached from the second liquid crystal panel 10B-2.

Embodiment 4

An embodiment 4 of the present invention will be explained with reference to FIG. 20. The present embodiment 4 shows an operative example of a method for forming spacer portions. In the present embodiment 4, the parts called by the same names as those of the above embodiment 1 are designated by the same symbols, but the suffix "-3" is attached thereto. The redundant explanations for the constructions and operational effects will be omitted.

Figure 20:
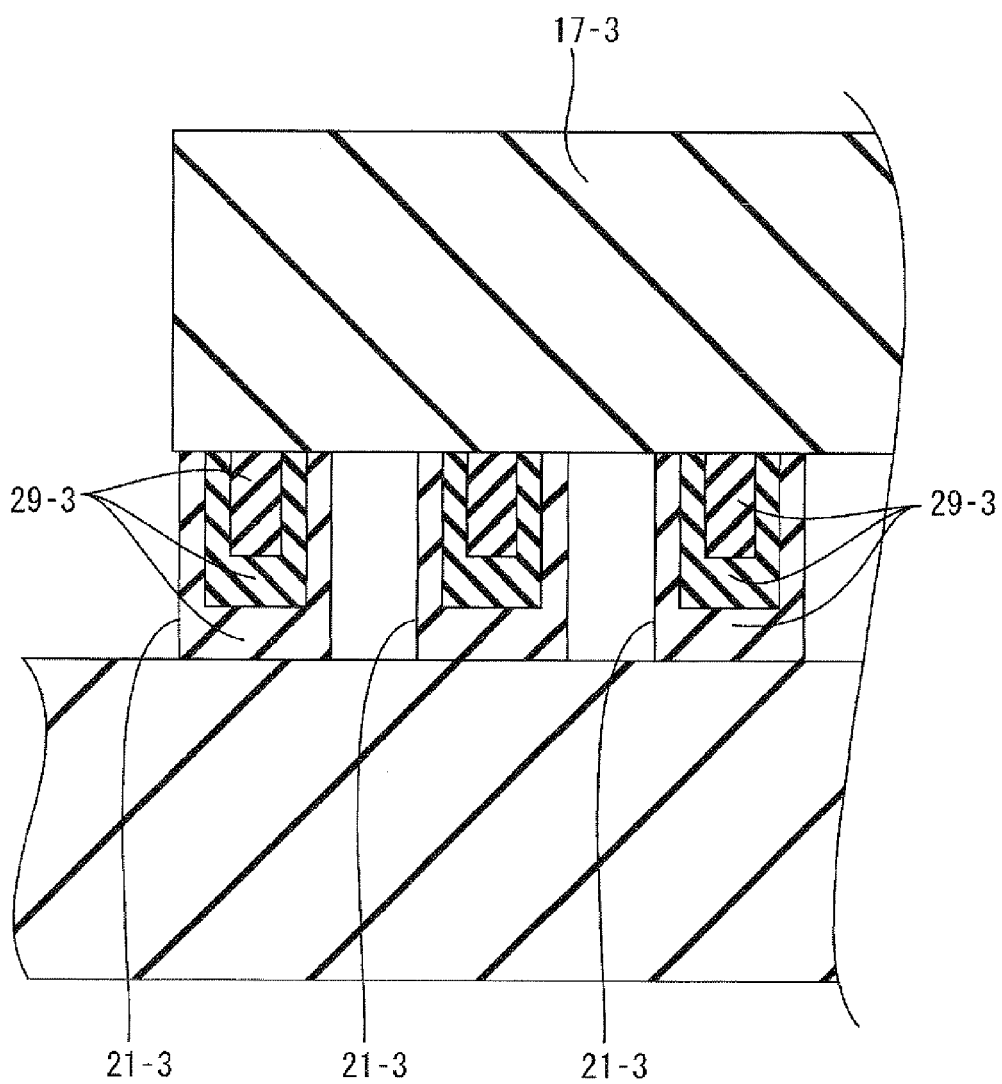
FIG. 20 is an enlarged sectional view showing spacer portions according to an embodiment 4 of the present invention.

Referring to FIG. 20, the spacer portions 21-3 are formed during a process of forming a color filter on the CF substrate 17-3. Specifically, while R, G and B colored films 29-3 of the color filter are formed on the CF substrate 17-3 by a photolithographic method, for example, R, G and B colored films 29-3 are also formed and stacked on the areas saved for spacer portions 21-3, in order to form the spacer portions 21-3. The present method enables the concurrent formation of the colored films 29-3 and the spacer portions 21-3, which can result in elimination of a spacer-portion forming process and avoidance of the use of another material for the spacer portions 21-3. Thus, the manufacturing process can be simplified.

Although FIG. 20 shows solely the spacer portions 21-3 provided on the radially outer side, the spacer portions 22-3 on the inner side can be also formed in a similar manner. The present construction may be modified so that one or two colored films 29-3 selected from R, G and B colored films 29-3 are used and stacked to form spacer portions 21-3, 22-3, which are not shown by a figure.

Embodiment 5

An embodiment 5 of the present invention will be explained with reference to FIG. 21. The present embodiment 5 shows another operative example of a method for forming spacer portions. In the present embodiment 5, the parts called by the same names as those of the above embodiment 1 are designated by the same symbols, but the suffix "-4" is attached thereto. The redundant explanations for the constructions and operational effects will be omitted.

Figure 21:
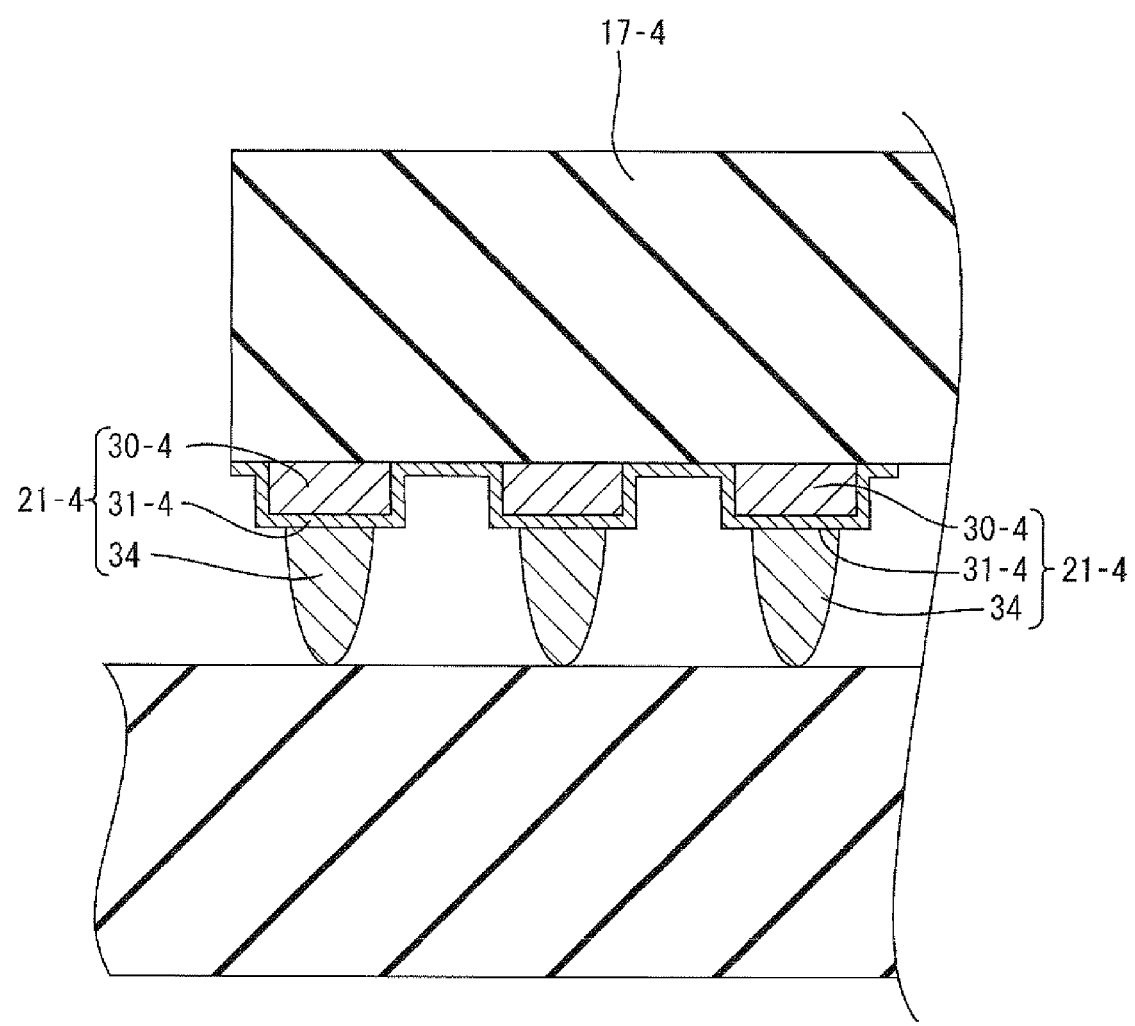
FIG. 21 is an enlarged sectional view showing spacer portions according to an embodiment 5 of the present invention.

Referring to FIG. 21, the spacer portions 21-4 have a construction in which a light blocking layer 30-4 and a counter electrode 31-4 are stacked and column spacers 34 formed of a photo spacer material are further stacked thereon. Specifically, while the light blocking layer 30-4 and the counter electrode 31-4 are formed on the CF substrate 17-4, they are also formed and stacked on the areas saved for the spacer portions 21-4. Photo spacers 34, e.g., those formed of photosensitive resin, are formed thereon, and then the formation of the spacer portions 21-4 is completed.

Embodiment 6

An embodiment of the present invention will be explained with reference to FIG. 22. The present embodiment 6 shows another operative example of a method for forming spacer portions. In the present embodiment 6, the parts called by the same names as those of the above embodiment 4 are designated by the same symbols, but the suffix "-5" is attached thereto. The redundant explanations for the constructions and operational effects will be omitted.

Figure 22:
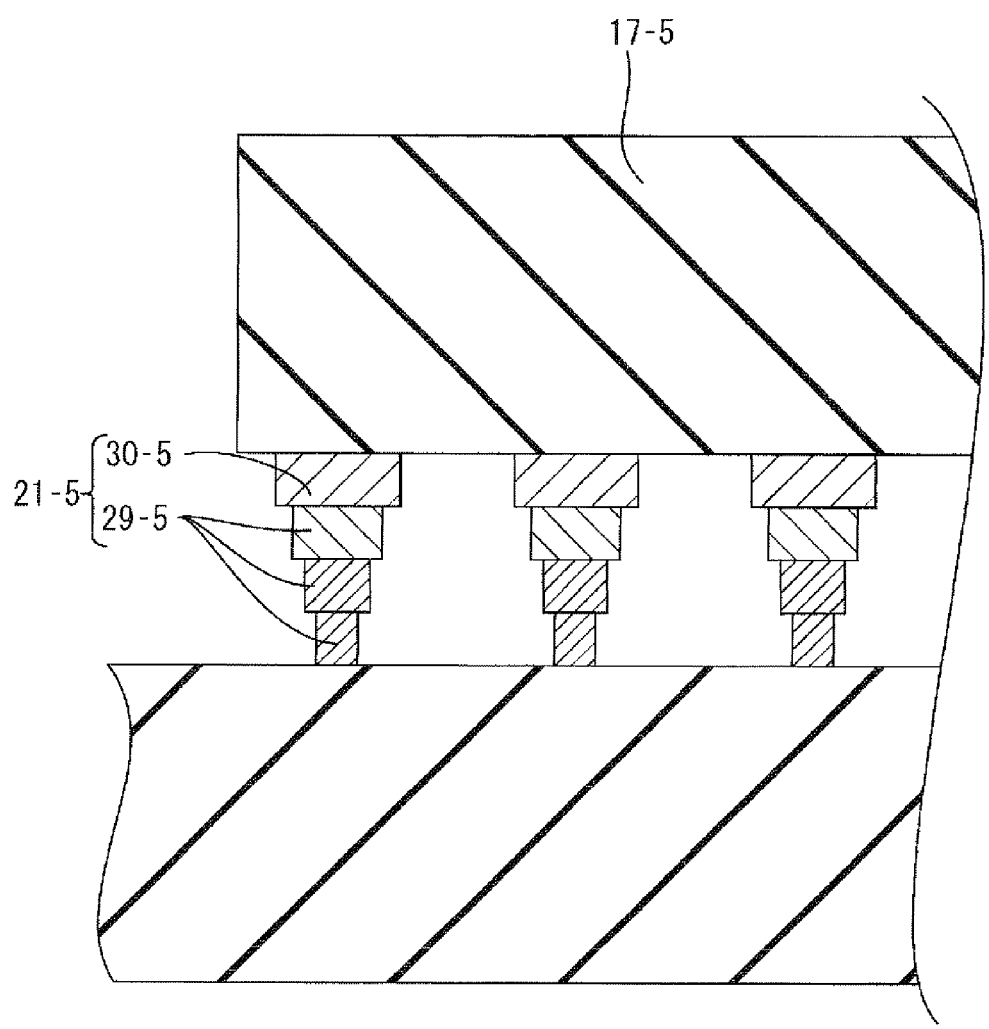
FIG. 22 is an enlarged sectional view showing spacer portions according to an embodiment 6 of the present invention.

Referring to FIG. 22, the spacer portions 21-5 have a construction in which colored films 29-5 are sequentially stacked on a light blocking layer 30-5. Specifically, while the light blocking layer 30-5 is formed on the CF substrate 17-5, it is also formed on the areas saved for the spacer portions 21-5. Further, while R, G and B colored films 29-5 of the color filter are formed on the CF substrate 17-5 by a photolithographic method, for example, R, G and B colored films 29-5 are also formed and stacked on the areas saved for spacer portions 21-5. Then, the formation of the spacer portions 21-5 is completed.

Embodiment 7

An embodiment 7 of the present invention will be explained with reference to FIG. 23. The present embodiment 7 shows another operative example of a method for forming spacer portions. In the present embodiment 7, the parts called by the same names as those of the above embodiment 5 or 6 are designated by the same symbols, but the suffix "-6" is attached thereto. The redundant explanations for the constructions and operational effects will be omitted.

Figure 23:
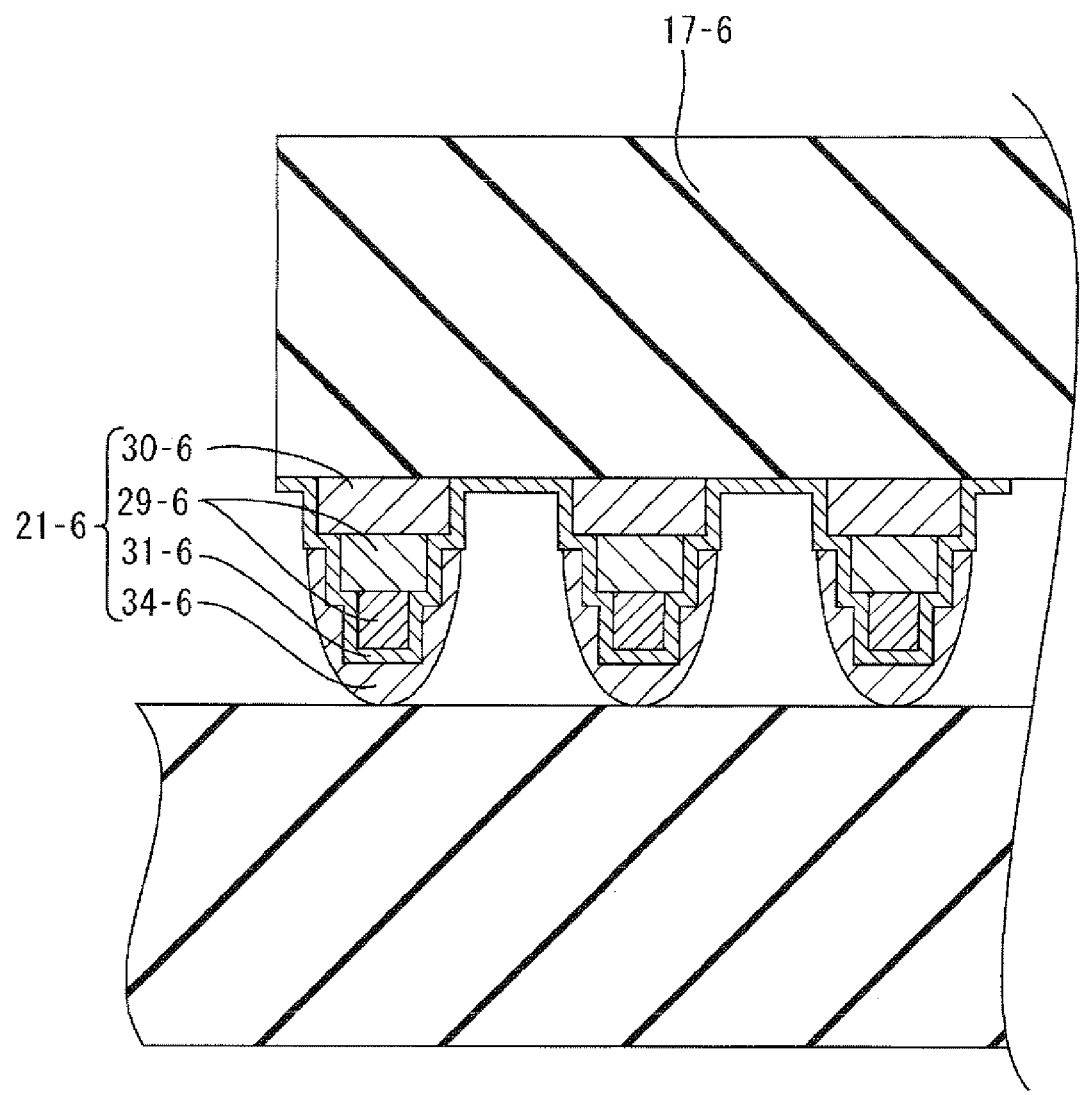
FIG. 23 is an enlarged sectional view showing spacer portions according to an embodiment 7 of the present invention.

Referring to FIG. 23, the spacer portions 21-6 have a construction in which two colored films 29-6 are stacked on a light blocking layer 30-6 and further a counter electrode 31-6 and photo spacers 34-6 are stacked thereon. Specifically, while the light blocking layer 30-6 is formed on the CF substrate 17-6, it is also formed on the areas saved for the spacer portions 21-6. Further, while R, G and B colored films 29-6 of the color filter are formed on the CF substrate 17-6, two colored films selected from R, G and B colored films 29-6 are also formed and stacked on the areas saved for spacer portions 21-6. Thereafter, while the counter electrode 31-6 is formed on the CF substrate 17-6, it is also formed on the areas saved for the spacer portions 21-6. Further, photo spacers 34, e.g., those formed of photosensitive resin, are formed thereon, and then the formation of the spacer portions 21-6 is completed.

Embodiment 8

An embodiment 8 of the present invention will be explained with reference to FIG. 24. The present embodiment 8 shows another operative example of a method for forming spacer portions. In the present embodiment 8, the parts called by the same names as those of the above embodiment 5 are designated by the same symbols, but the suffix "-7" is attached thereto. The redundant explanations for the constructions and operational effects will be omitted.

Figure 24:
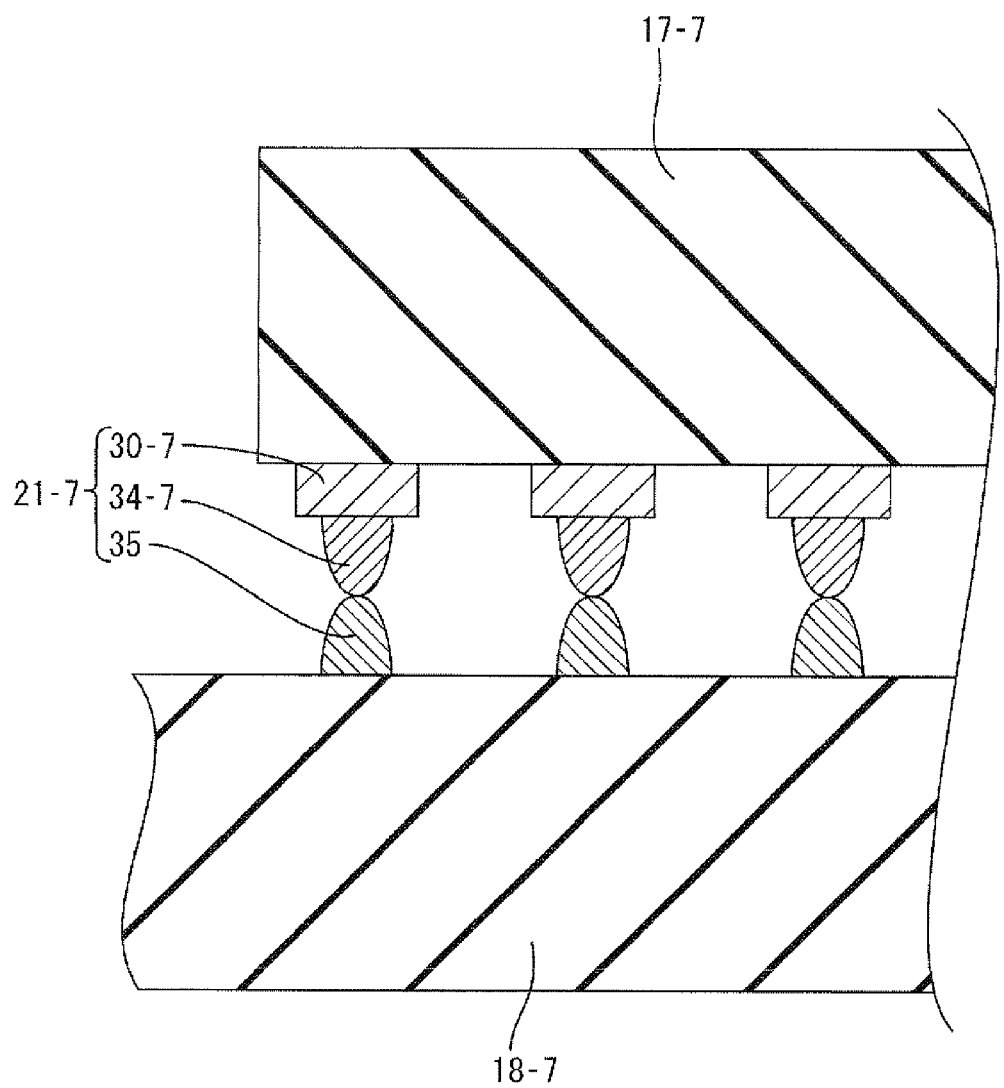
FIG. 24 is an enlarged sectional view showing spacer portions according to an embodiment 8 of the present invention.

Referring to FIG. 24, the spacer portions 21-7 include a light blocking layer 30-7 and column spacers 34-7 made of a photo spacer material, which are stacked on the CF substrate 17-7. The spacer portions 21-7 further include column spacers 35 made of a photo spacer material, which are formed on the array substrate 18-7. The spacer portions 21-7 are provided so that the photo spacers 34-7 on the CF substrate 17-7 butt against the photo spacers 35 on the array substrate 18-7. Specifically, while the light blocking layer 30-7 is formed on the CF substrate 17-7, it is also formed on the areas saved for the spacer portions 21-7. Further, photo spacers 34-7, e.g., those made of photosensitive resin, are formed thereon, while photo spacers 35, e.g., those made of photosensitive resin, are formed on the areas of the array substrate 18-7 saved for the spacer portions 21-7. The substrates 17-7, 18-7 are attached to each other so that the photo spacers 34-7, 35 butt against each other. Then, the formation of the spacer portions 21-7 is completed.

Embodiment 9

An embodiment 9 of the present invention will be explained with reference to FIG. 25. The present embodiment 9 shows a modification in which spacer portions are additionally provided on the areas saved for sealant portions. In the present embodiment 9, the parts called by the same names as those of the above embodiment 1 are designated by the same symbols, but the suffix "-8" is attached thereto. The redundant explanations for the constructions and operational effects will be omitted.

Figure 25:
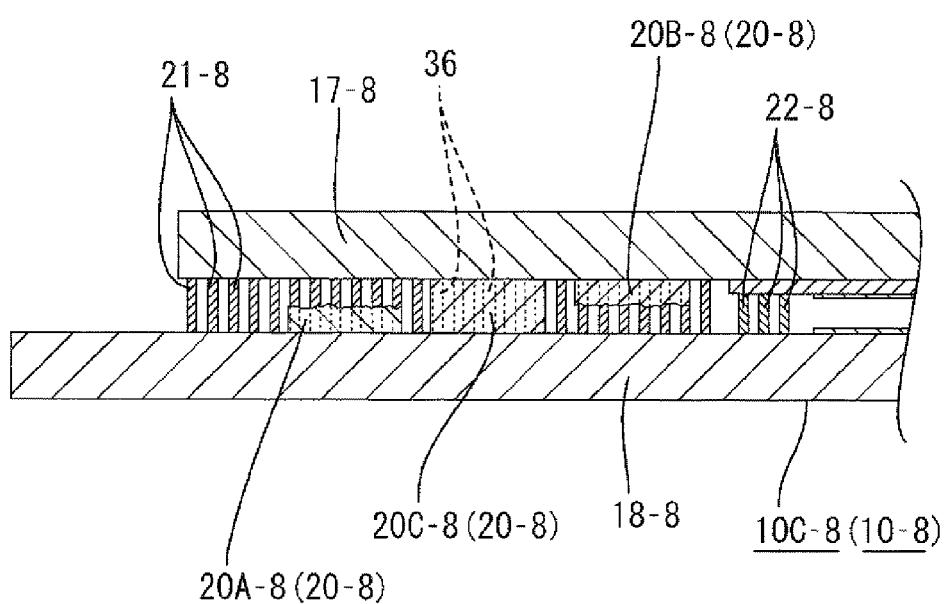
FIG. 25 is an enlarged sectional view showing spacer portions according to an embodiment 9 of the present invention.

Referring to FIG. 25, spacer portions 21-8, 22-8 are provided on the radially inner side and the radially outer side of the sealant portion 20-8, respectively. Further, spacer portions 36 are also provided on the areas saved for sealant portions 20-8. During the manufacture of first and second liquid crystal panels, the spacer portions 36 are formed on the CF substrate 17-8 prior to formation of the sealant portions 20A-8, 20B-8. That is, during the manufacture of first and second liquid crystal panels, the sealant portion 20A-8 or 20B-8 is formed on an area where spacer portions 36 have been formed. When a third liquid crystal panel 10C-8 is thereafter manufactured, the sealant portion 20C-8 is also formed on an area where spacer portions 36 are provided. According to the construction, the gap between the substrates 17-8, 18-8 can be more adequately maintained.

Embodiment 10

Figure 27:
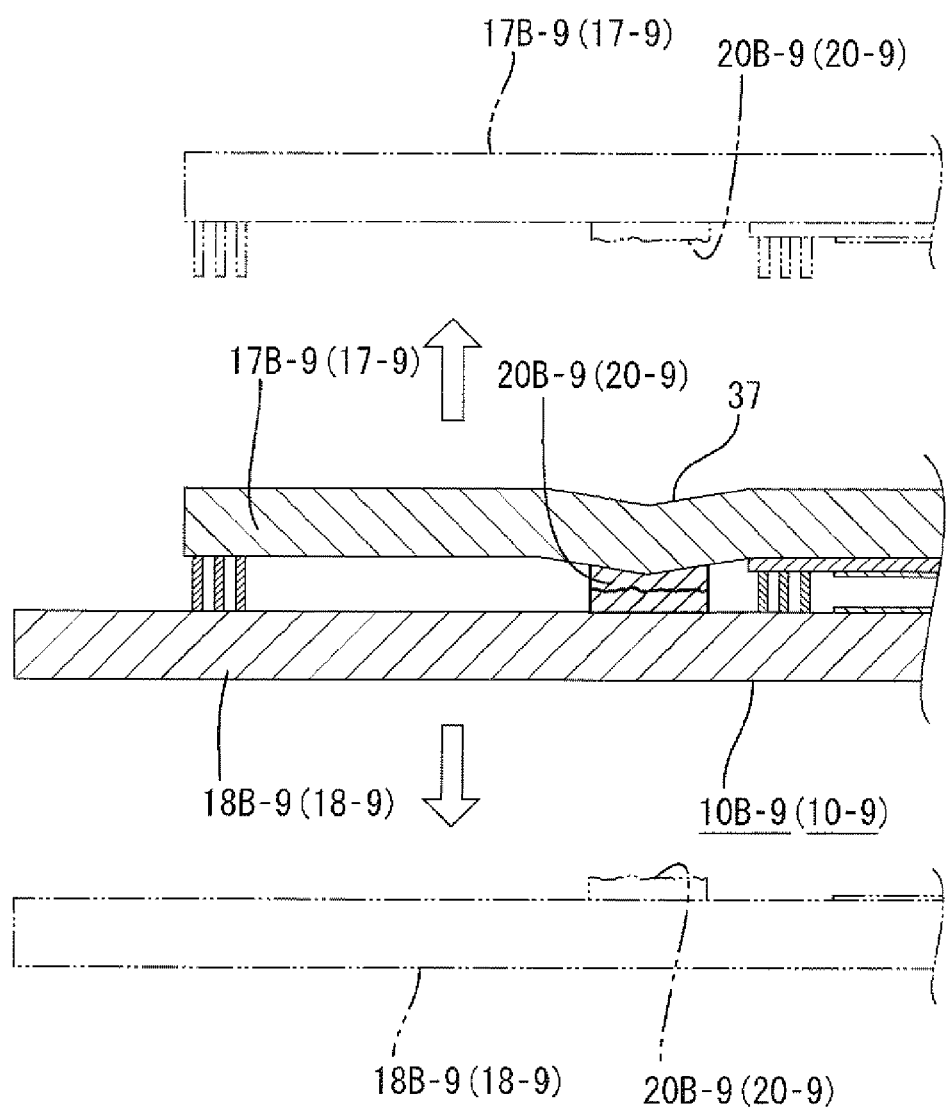
FIG. 27 is an enlarged sectional view showing a process of detaching the substrates from a second liquid crystal panel.
Figure 28:
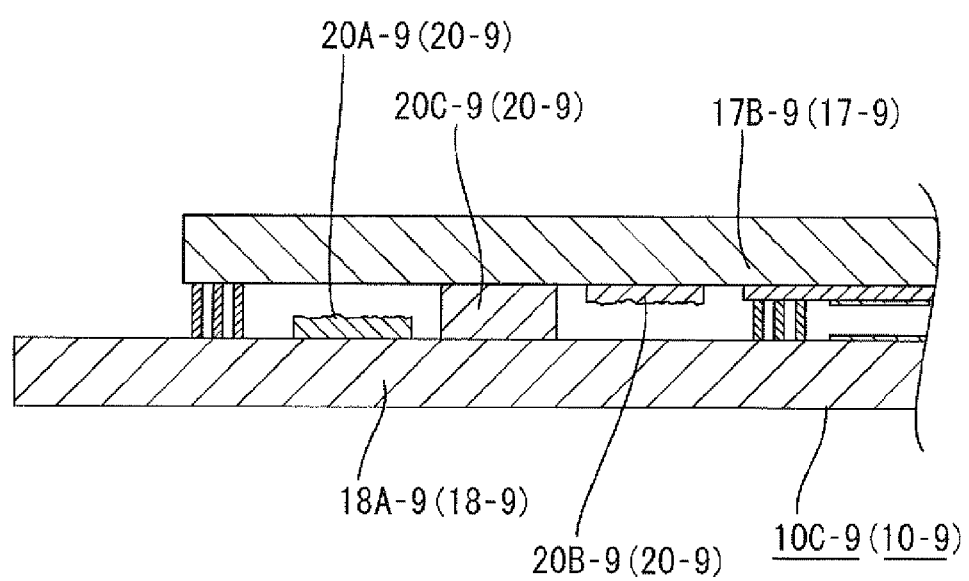
FIG. 28 is an enlarged sectional view of a third liquid crystal panel formed by attaching the substrates to each other.

An embodiment 10 of the present invention will be explained with reference to FIGS. 26 to 28. The present embodiment 10 shows a modification of a manufacturing method for a first liquid crystal panel and a second liquid crystal panel. In the present embodiment 10, the parts called by the same names as those of the above embodiment 1 are designated by the same symbols, but the suffix "-9" is attached thereto. The redundant explanations for the constructions and operational effects will be omitted.

Figure 26:
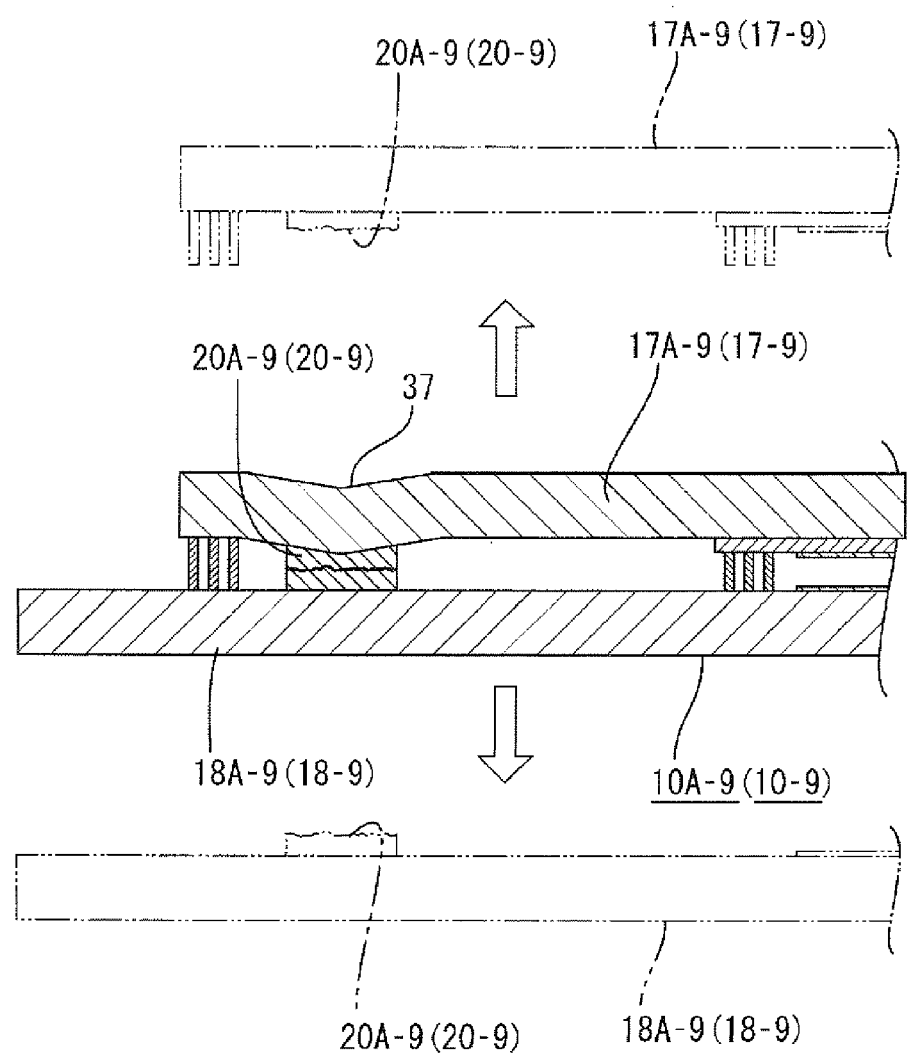
FIG. 26 is an enlarged sectional view showing a process of detaching the substrates from a first liquid crystal panel according to an embodiment 10 of the present invention.

Referring to FIG. 26, when the substrates are attached to each other during the manufacture of a first liquid crystal panel 10A-9, the area of the CF substrate 17A-9 corresponding to the sealant portion 20A-9 is slightly bent to form a concave portion 37. Similarly, during the manufacture of a second liquid crystal panel 10B-9, the area of the CF substrate 17B-9 corresponding to the sealant portion 20B-9 is slightly bent to form a concave portion 37 as shown in FIG. 27, when the substrates are attached to each other. According to the construction, the sealant portion 20A-9 or 20B-9 can be reduced to be low in height, compared to a construction including an unbent CF substrate 17-9. Therefore, in a third liquid crystal panel 10 to be manufactured by the reuse of the substrates 17-9, 18-9 detached from the first or second liquid crystal panel 10A-9, 10B-9, referring to FIG. 28, the first sealant portion 20A-9 and the second sealant portion 20B-9 left on the substrates 17-9, 18-9 can be relatively low in height. Consequently, the remaining first or second sealant portion 20A-9, 20B-9 on the third liquid crystal panel 10C-9 can be effectively prevented from interfering with the substrate 17-9, 18-9 on the other side.

Other Embodiments

The present invention is not limited to the embodiments explained in the above description made with reference to the drawings. The following embodiments may be included in the technical scope of the present invention, for example.

Figure 29:
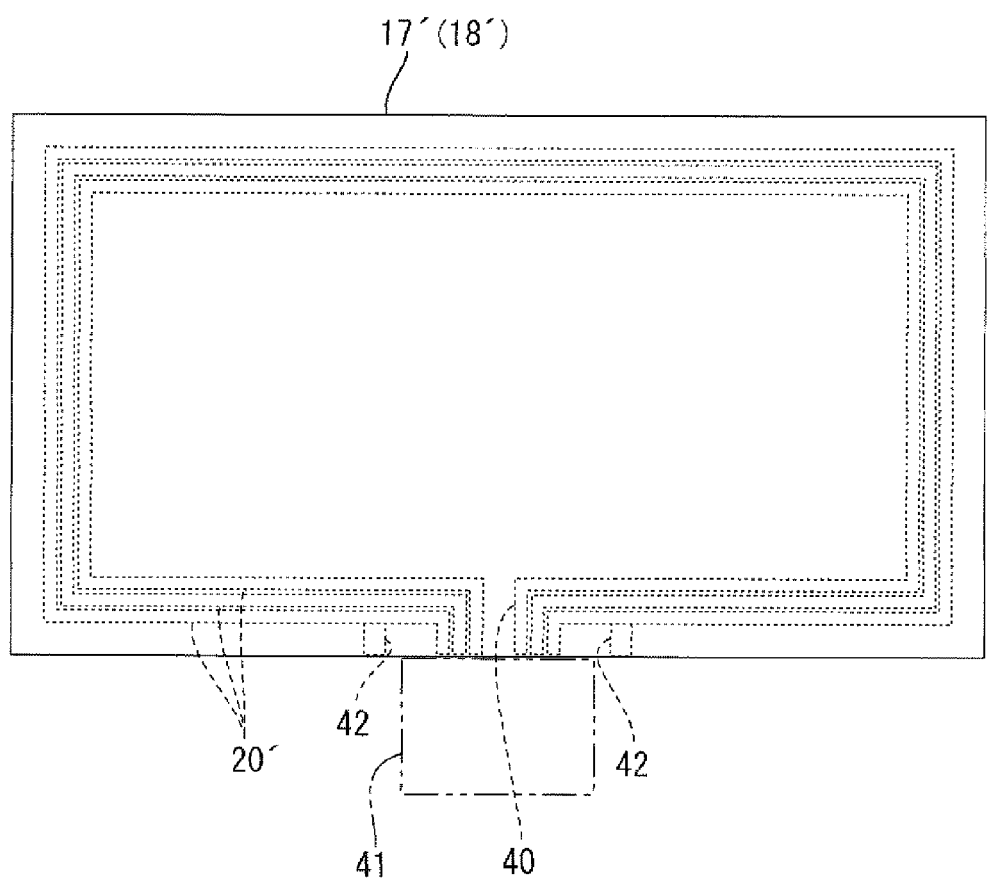
FIG. 29 is a plan view showing a process of vacuum injection of a liquid crystal material into a liquid crystal panel according to another embodiment (1).

(1) In the above embodiments, the manufacture of a liquid crystal panel by use of "a one-drop-fill method" is shown, in which a liquid crystal material is dropped on one of the substrates and thereafter the substrates are attached to each other. However, "a vacuum injection method" may be used instead. That is, after the substrates are attached to each other, a liquid crystal material may be injected between the substrates by vacuum injection. In this case, the sealant portion 20' is formed so that a liquid crystal inlet 40 is provided as shown in FIG. 29. If a pair of protruding portions 42 are provided on both sides of the liquid crystal inlet 40 with a distance larger than the width of a liquid crystal bath 41 therebetween, the liquid crystal material can be prevented from attaching to the outer circumferential edges of the substrates 17', 18' (i.e., to the areas on the outer side of the sealant portion 20'). The protruding portions 42 can be formed at the time of formation of the sealant portion 20'. The liquid crystal inlet 40 is sealed after the vacuum injection of the liquid crystal.

(2) In the above embodiments, liquid crystal is dropped on the array substrate after the sealant portion is formed thereon. However, the present invention can include an instance where liquid crystal is dropped on the CF substrate after a sealant portion is formed thereon.

(3) In the above embodiments, the spacer portions are formed on the CF substrate. However, the present invention can include an instance where spacer portions are formed on the array substrate.

(4) In the above embodiments, two kinds of liquid crystal panels, which differ in position of the sealant portion to be formed thereon, are manufactured by a panel manufacturing process. However, the present invention can include an instance where the liquid crystal panels to be manufactured include three or more kinds of liquid crystal panels, which differ in position of the sealant portion to be formed thereon.

(5) In the above embodiments, the spacer portions are provided on the inner and outer sides of the sealant portion. However, the present invention can include a construction in which spacer portions are provided solely on the inner side of the sealant portion, or are provided solely on the outer side of the sealant portion. Further, the present invention can include a construction in which spacer portions are eliminated.

(6) In the above embodiments, TFTs are used as switching elements. However, the present invention can include a construction that uses another type of switching elements than TFTs.

(7) In the above embodiments, cold cathode tubes are used as light sources of the backlight. However, the present invention can include a construction that uses another type of linear light sources than cold cathode tubes (such as hot cathode tubes), and also include a construction that uses LEDs.

(8) In the above embodiments, a television receiver as a device having a tuner is shown for illustrative purposes. However, the present invention can be applied to a display device that does not have a tuner.

The invention claimed is:

1. A manufacturing method of a liquid crystal panel having a construction in which a liquid crystal layer and a sealant portion surrounding and sealing said liquid crystal layer are provided between a pair of substrates attached to each other, said manufacturing method comprising:
manufacturing a first liquid crystal panel and a second liquid crystal panel by a panel manufacturing process, said first liquid crystal panel and said second liquid crystal panel differing from each other in position of said sealant portion to be formed thereon;
detaching said substrates from a defective liquid crystal panel by a substrate detachment process, said defective liquid crystal panel being one of said first liquid crystal panel and said second liquid crystal panel that includes a defect; and
manufacturing a third liquid crystal panel by a reuse-panel manufacturing process, said third liquid crystal panel being formed by attaching a substrate detached from said first liquid crystal panel and a substrate detached from said second liquid crystal panel to each other, wherein:
said first liquid crystal panel includes a first sealant portion, and said second liquid crystal panel includes a second sealant portion;
said reuse-panel manufacturing process includes forming a third sealant portion by a sealant-portion forming process, said third sealant portion being formed on one of said substrate detached from said first liquid crystal panel and said substrate detached from said second liquid crystal panel; and
said third sealant portion is located to differ in position from both of said first sealant portion on said first liquid crystal panel and said second sealant portion on said second liquid crystal panel.

2. A manufacturing method of a liquid crystal panel, as in claim 1, wherein said third sealant portion formed by said sealant-portion forming process is located to be lateral to both of said first sealant portion and said second sealant portion.

3. A manufacturing method of a liquid crystal panel, as in claim 1, wherein said third sealant portion formed by said sealant-portion forming process is located to be medial to both of said first sealant portion and said second sealant portion.

4. A manufacturing method of a liquid crystal panel, as in claim 1, wherein:
each of said first liquid crystal panel and said second liquid crystal panel manufactured by said panel manufacturing process includes a spacer portion on at least one of said pair of substrates so that a gap is maintained between said pair of substrates; and
said spacer portion is used by said reuse-panel manufacturing process so as to maintain a gap between said substrates to be attached to each other by said reuse-panel manufacturing process.

5. A manufacturing method of a liquid crystal panel, as in claim 4, wherein said spacer portion formed by said panel manufacturing process includes spacer portions located to be capable of being arranged on inner and outer sides of said third sealant portion to be formed by said reuse-panel manufacturing process.

6. A manufacturing method of a liquid crystal panel, as in claim 4, wherein:
said panel manufacturing process includes forming a switching element and a pixel electrode connected to said switching element on one of said pair of substrates, and further includes forming a color filter having an array of a plurality of colored films on the other of said pair of substrates; and
said spacer portion is formed on the other of said pair of substrates.

7. A manufacturing method of a liquid crystal panel, as in claim 6, wherein said spacer portion formed by said panel manufacturing process includes a stack of at least one of said plurality of colored films.

* * * * *